US010728583B2

(12) United States Patent
Han et al.

(10) Patent No.: US 10,728,583 B2
(45) Date of Patent: Jul. 28, 2020

(54) MULTIMEDIA INFORMATION PLAYING METHOD AND SYSTEM, STANDARDIZED SERVER AND LIVE BROADCAST TERMINAL

(71) Applicant: Beijing Xiaomi Mobile Software Co., Ltd., Beijing (CN)

(72) Inventors: Shangyou Han, Beijing (CN); Chao Sun, Beijing (CN); Zegao Yu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 15/792,114

(22) PCT Filed: Oct. 31, 2016

(86) PCT No.: PCT/CN2016/104099
§ 371 (c)(1),
(2) Date: Oct. 24, 2017

(87) PCT Pub. No.: WO2018/076358
PCT Pub. Date: May 3, 2018

(65) Prior Publication Data
US 2019/0261026 A1    Aug. 22, 2019

(51) Int. Cl.
*H04N 21/218*    (2011.01)
*H04L 29/06*    (2006.01)
(Continued)

(52) U.S. Cl.
CPC . *H04N 21/21805* (2013.01); *H04L 29/06027* (2013.01); *H04N 21/2187* (2013.01); *H04N 21/41407* (2013.01); *H04N 21/6587* (2013.01)

(58) Field of Classification Search
CPC ......... H04L 29/06027; H04N 21/2187; H04N 21/6587; H04N 21/21805; H04N 21/41407
See application file for complete search history.

(56) References Cited

U.S. PATENT DOCUMENTS 9,462,249 B2    10/2016 Goldberg et al.
2010/0128103 A1    5/2010 Sim et al.
(Continued)

FOREIGN PATENT DOCUMENTS

CN    101909160 A    12/2010
CN    103607570 A    2/2014
(Continued)

OTHER PUBLICATIONS

International Search Report dated Jun. 30, 2017 in PCT/CN2016/104099 (with English translation of categories of cited documents), 5 pages.
(Continued)

*Primary Examiner* — Azizul Choudhury
(74) *Attorney, Agent, or Firm* — Oblon, McClelland, Maier & Neustadt, L.L.P.

(57) ABSTRACT

The present disclosure relates to a multimedia information playing method and system, a standardized server and a live broadcast terminal, and relates to the technical field of networks. The method includes receiving n pieces of multimedia information from the n acquisition devices, respectively, each of the n pieces of multimedia information being obtained by acquiring ambient environmental information by a corresponding acquisition device; receiving a selection instruction from the live broadcast terminal; selecting initial multimedia information from the n pieces of multimedia information based on the selection instruction; and sending
(Continued)

the initial multimedia information to the playing terminal that is configured to play the initial multimedia information.

20 Claims, 22 Drawing Sheets

(51) Int. Cl.
*H04N 21/2187* (2011.01)
*H04N 21/414* (2011.01)
*H04N 21/6587* (2011.01)

(56) References Cited

U.S. PATENT DOCUMENTS

| | | | |
|---|---|---|---|
| 2011/0055347 A1 | 3/2011 | Hu et al. | |
| 2011/0280540 A1 | 11/2011 | Woodman | |
| 2013/0347046 A1 | 12/2013 | Bluvband et al. | |
| 2014/0040360 A1 | 2/2014 | Privat | |
| 2014/0064701 A1 | 3/2014 | Woodman | |
| 2014/0072270 A1 | 3/2014 | Goldberg et al. | |
| 2015/0006637 A1 | 1/2015 | Kangas et al. | |
| 2015/0304196 A1* | 10/2015 | Sun | H04L 43/0876 709/219 |
| 2015/0331856 A1* | 11/2015 | Choi | G06Q 50/01 707/746 |
| 2015/0358671 A1 | 12/2015 | Woodman | |
| 2016/0029047 A1 | 1/2016 | Spidella et al. | |
| 2016/0203300 A1 | 7/2016 | Hu et al. | |
| 2016/0314819 A1 | 10/2016 | Elsner | |
| 2017/0134762 A1 | 5/2017 | Goldberg et al. | |

FOREIGN PATENT DOCUMENTS

| | | |
|---|---|---|
| CN | 104735542 A | 6/2015 |
| CN | 204810380 U | 11/2015 |
| CN | 105828091 A | 8/2016 |
| CN | 105939480 A | 9/2016 |
| EP | 2 819 416 A1 | 12/2014 |
| EP | 2 916 558 A1 | 9/2015 |
| JP | 2009-27703 A | 2/2009 |
| JP | 2013-62591 A | 4/2013 |
| JP | 2016-171382 A | 9/2016 |
| RU | 2 503 998 C2 | 1/2014 |

OTHER PUBLICATIONS

Written Opinion of the International Search Authority dated Jun. 30, 2017 in PCT/CN2016/104099, 4 pages.
Extended European Search Report dated Jan. 16. 2018 in Patent Application No. 17198820.7, 11 pages.
Mudassar Ahmad Mughal, et al. "Context-dependent software solutions to handle video synchronization and delay in collaborative live mobile video production", Personal and Ubiquitous Computing, vol. 18, No. 3, XP058045888, 2014, pp. 709-721.
First Office Action of the Japanese Patent Application No. 2017-562014, dated Jan. 23, 2019 (with English translation), 8 pages.
Second Office Action of the Japanese Patent Application No. 2017-562014 , dated Apr. 8, 2019 (with English translation), 5 pages.
Notice of Allowance of the Japanese application No. 2017-562014, dated Jul. 2, 2019 (with English translation), 5 pages.
Combine Russian Federation Office Action and Search Report dated Jun. 5, 2018 in Patent Application No. 2017146779/07(079945) (with English translation and English translation of categories of cited documents), 15 pages.
International Search Report dated Jun. 30, 2017 in PCT/CN2016/104099 (previously filed submitting English translation only), 3 pages.

* cited by examiner

MULTIMEDIA INFORMATION PLAYING METHOD AND SYSTEM, STANDARDIZED SERVER AND LIVE BROADCAST TERMINAL

CROSS-REFERENCE TO RELATED APPLICATIONS

This application is filed based upon and claims priority to International Patent Application PCT/CN2016/104099, filed on Oct. 31, 2016, the entire contents of which are incorporated herein by reference.

TECHNICAL FIELD

The present disclosure generally relates to the technical field of networks, and more particularly, to a multimedia information playing method and system, a standardized server and a live broadcast terminal.

BACKGROUND

Along with rapid development of a network technology, more and more network live broadcast platforms appear. A user may live broadcast various kinds of multimedia information on a network broadcast platform.

In a related technology, a live broadcast mobile phone (such as a mobile phone of a host) may log in a server of a network live broadcast platform. At this moment, the server may send a live broadcast network address to the live broadcast mobile phone, then a camera of the live broadcast mobile phone may acquire live broadcast video information, a microphone of the live broadcast mobile phone may acquire live broadcast audio information, and the live broadcast mobile phone may also send multimedia information including the acquired live broadcast video information and live broadcast audio information to the live broadcast network address. A playing mobile phone (such as a mobile phone of a viewer) may also log in the server of the network live broadcast platform, and the server is triggered to send the multimedia information of the live broadcast network address to the playing mobile phone for the playing mobile phone to play the received multimedia information.

In the related technology, a camera of a mobile phone may acquire multimedia information of only one viewing angle, so that a playing mobile phone may play the multimedia information of the only one viewing angle. Therefore, a multimedia information playing effect is relatively poor.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a multimedia information playing method, applied to a standardized server in a multimedia information playing system. The multimedia information playing system includes n acquisition devices, the standardized server, a live broadcast terminal and a playing terminal, n being an integer more than or equal to 2. The method includes receiving n pieces of multimedia information from the n acquisition devices, respectively, each of the n pieces of multimedia information being obtained by acquiring ambient environmental information by a corresponding acquisition device; receiving a selection instruction from the live broadcast terminal; selecting initial multimedia information from the n pieces of multimedia information based on the selection instruction; and sending the initial multimedia information to the playing terminal that is configured to play the initial multimedia information.

The method also includes receiving a changing instruction from the live broadcast terminal; selecting target multimedia information from the n pieces of multimedia information based on the changing instruction; changing multimedia information to be sent to the playing terminal from the initial multimedia information to the target multimedia information; and sending the target multimedia information to the playing terminal that is configured to play the target multimedia information.

The standardized server has at least three network addresses. The method also includes receiving a live broadcast request of the live broadcast terminal, the live broadcast request including the number n of the acquisition devices; selecting n first network addresses and a second network address from the at least three network addresses of the standardized server respectively, the n first network addresses and the second network address indicating different storage modules in the standardized server, respectively; sending the n first network addresses to the live broadcast terminal to enable the live broadcast terminal to send the n first network addresses to the n acquisition devices respectively, wherein receiving the n pieces of multimedia information sent by the n acquisition devices, respectively, comprises receiving multimedia information sent by the n acquisition devices based on the n first network addresses, respectively.

The method also includes storing the n pieces of multimedia information in the storage modules indicated by the n first network addresses, respectively; performing first standardized processing on the n pieces of multimedia information, parameters of the n pieces of multimedia information subjected to the first standardized processing being consistent with a playing parameter of the live broadcast terminal; and sending the n pieces of multimedia information subjected to the first standardized processing to the live broadcast terminal that is configured to simultaneously play the n pieces of multimedia information subjected to the first standardized processing and generate the selection instruction based on an operation of a user.

The method also includes performing second standardized processing on the initial multimedia information, a parameter of the initial multimedia information subjected to the second standardized processing being consistent with a playing parameter of the playing terminal; storing the initial multimedia information subjected to the second standardized processing into the storage module indicated by the second network address; and receiving a playing request of the playing terminal, the playing request including the second network address.

Sending the initial multimedia information to the playing terminal includes acquiring the initial multimedia information subjected to the second standardized processing from the storage module indicated by the second network address; and sending the initial multimedia information subjected to the second standardized processing to the playing terminal by using a live broadcast delivery mechanism and a Content Delivery Network (CDN) mechanism.

A format of the multimedia information acquired by each acquisition device is: a High Definition Multimedia Interface (HDMI) format or a Serial Digital Interface (SDI) format.

Receiving the n pieces of multimedia information from the n acquisition devices, respectively, includes receiving the n pieces of multimedia information sent by the n acquisition devices respectively on the basis of a Real Time Messaging Protocol (RTMP).

Aspects of the disclosure also provide a multimedia information playing method, applied to a live broadcast terminal in a multimedia information playing system. The multimedia information playing system includes n acquisition devices, a standardized server, the live broadcast terminal and a playing terminal, n being an integer more than or equal to 2. The method includes generating a selection instruction based on a first operation of a user; and sending the selection instruction to the standardized server that is configured to select initial multimedia information from n pieces of multimedia information acquired by the n acquisition devices based on the selection instruction, and send the initial multimedia information to the playing terminal.

The method also includes generating a changing instruction based on a second operation of the user; and sending the changing instruction to the standardized server that is configured to change multimedia information to be sent to the playing terminal from the initial multimedia information to target multimedia information based on the changing instruction.

The standardized server has at least three network addresses. The method also includes, before the selection instruction is sent to the standardized server, sending a live broadcast request to the standardized server, the live broadcast request including the number n of the acquisition devices, to enable the standardized server to select n first network addresses and a second network address from the at least three network addresses of the standardized server, respectively; receiving the n first network addresses sent by the standardized server; and sending the n first network addresses to the n acquisition devices respectively to enable each of the n acquisition devices to send the multimedia information to the standardized server based on the received first network addresses after acquiring the multimedia information.

The method also includes receiving n pieces of multimedia information subjected to first standardized processing from the standardized server, the n pieces of multimedia information being stored in n storage modules indicated by the n first network addresses respectively; and synchronously playing the n pieces of multimedia information subjected to the first standardized processing on a user interface.

A format of the multimedia information acquired by each of the n acquisition devices is: a High-Definition Multimedia Interface (HDMI) format or a Serial Digital Interface (SDI) format.

Aspects of the disclosure also provide a standardized server, belonging to a multimedia information playing system. The multimedia information playing system includes n acquisition devices, the standardized server, a live broadcast terminal and a playing terminal, n being an integer more than or equal to 2. The standardized server includes a processor and a memory configured to store instructions executable by the processor. The processor is configured to receive n pieces of multimedia information from the n acquisition devices, respectively, each of the n pieces of multimedia information being obtained by acquiring ambient environmental information by a corresponding acquisition device; receive a selection instruction from the live broadcast terminal; select initial multimedia information from the n pieces of multimedia information based on the selection instruction; and send the initial multimedia information to the playing terminal that is configured to play the initial multimedia information.

The processor is also configured to receive a changing instruction from the live broadcast terminal; select target multimedia information from the n pieces of multimedia information based on the changing instruction; change multimedia information to be sent to the playing terminal from the initial multimedia information to the target multimedia information; and send the target multimedia information to the playing terminal that is configured to play the target multimedia information.

The standardized server has at least three network addresses. The processor is also configured to receive a live broadcast request of the live broadcast terminal, the live broadcast request including the number n of the acquisition devices; select n first network addresses and a second network address from the at least three network addresses of the standardized server respectively, the n first network addresses and the second network address indicating different storage modules in the standardized server, respectively; send the n first network addresses to the live broadcast terminal to enable the live broadcast terminal to send the n first network addresses to the ti acquisition devices, respectively; and receive multimedia information sent by the n acquisition devices based on the n first network addresses, respectively.

The processor is also configured to store the a pieces of multimedia information in the storage modules indicated by the n first network addresses respectively; perform first standardized processing on the n pieces of multimedia information, parameters of the n pieces of multimedia information subjected to the first standardized processing being consistent with a playing parameter of the live broadcast terminal; and send the n pieces of multimedia information subjected to the first standardized processing to the live broadcast terminal that is configured to simultaneously play the n pieces of multimedia information subjected to the first standardized processing and generate the selection instruction based on an operation of a user.

The processor is also configured to perform second standardized processing on the initial multimedia information, a parameter of the initial multimedia information subjected to the second standardized processing being consistent with a playing parameter of the playing terminal; store the initial multimedia information subjected to the second standardized processing into the storage module indicated by the second network address; receive a playing request of the playing terminal, the playing request including the second network address; acquire the initial multimedia information subjected to the second standardized processing from the storage module indicated by the second network address; and send the initial multimedia information subjected to the second standardized processing to the playing terminal by using a live broadcast delivery mechanism and a Content Delivery Network (CDN) mechanism.

A format of the multimedia information acquired by each acquisition device is: a High-Definition Multimedia Interface (HDMI) format or a Serial Digital Interface (SDI) format.

The processor is also configured to receive the n pieces of multimedia information sent by the n acquisition devices respectively on the basis of a Real Time Messaging Protocol (RTMP).

Aspects of the disclosure also provide a live broadcast terminal, belonging to a multimedia information playing system. The multimedia information playing system includes n acquisition devices, a standardized server and a playing terminal, n being an integer more than or equal to 2. The live broadcast terminal includes a processor and a memory configured to store instructions executable by the processor. The processor is configured to generate a selection instruction based on a first operation of a user, and send the selection instruction to the standardized server that is configured to select initial multimedia information from n pieces of multimedia information acquired by the n acquisition devices based on the selection instruction, and send the initial multimedia information to the playing terminal.

The processor is further configured to generate a changing instruction based on a second operation of the user; and send the changing instruction to the standardized server that is configured to change multimedia information to be sent to the playing terminal from the initial multimedia information to target multimedia information based on the changing instruction.

The standardized server has at least three network addresses. The processor is further configured to before the selection instruction is sent to the standardized server, send a live broadcast request to the standardized server, the live broadcast request including the number n of the acquisition devices, to enable the standardized server to select n first network addresses and a second network address from the at least three network addresses of the standardized server respectively; receive the n first network addresses sent by the standardized server; and send the n first network addresses to the n acquisition devices respectively to enable each of the n acquisition devices to send the multimedia information to the standardized server based on the received first network addresses after acquiring the multimedia information.

The processor is further configured to receive n pieces of multimedia information subjected to first standardized processing from the standardized server, the n pieces of multimedia information being stored in n storage modules indicated by the n first network addresses respectively; and synchronously play the n pieces of multimedia information subjected to the first standardized processing on a user interface.

A format of the multimedia information acquired by each of the n acquisition devices is: a High-Definition Multimedia Interface (HDMI) format or a Serial Digital Interface (SDI) format.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
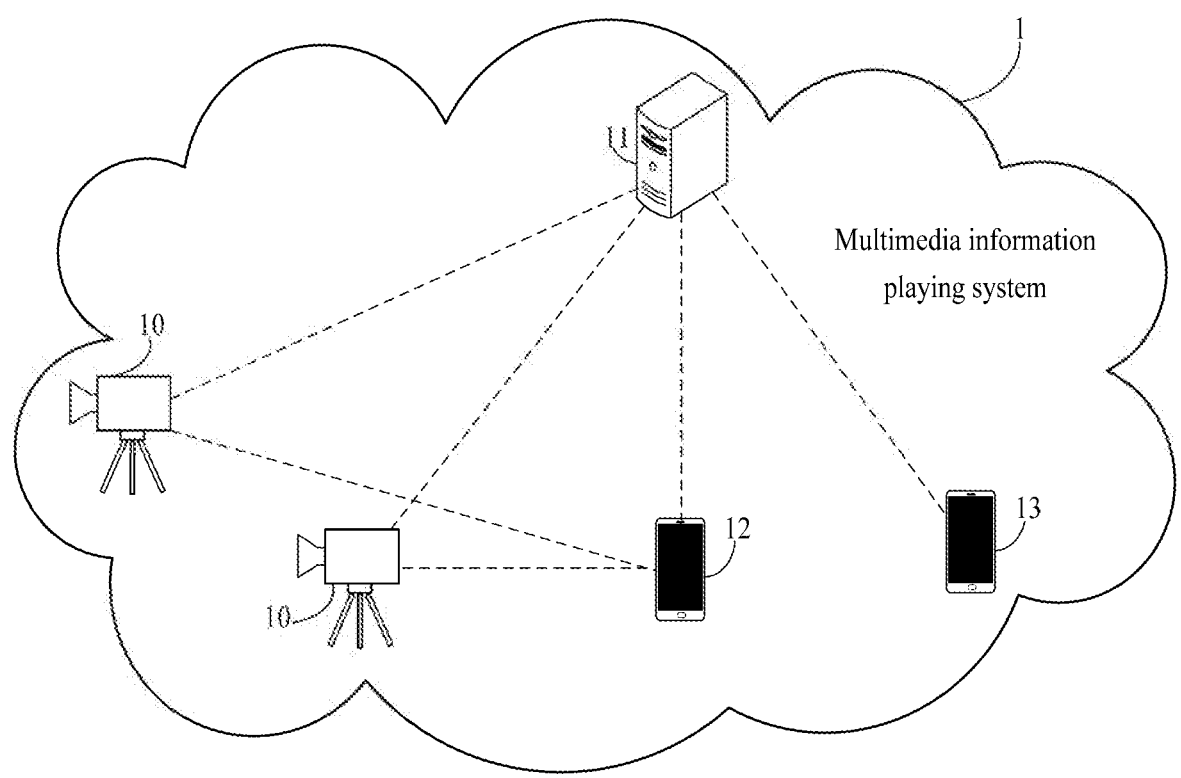
FIG. 1 is a structure diagram of a multimedia information playing system according to an exemplary aspect of the present disclosure.

FIG. 1 is a structure diagram of a multimedia information playing system according to an exemplary aspect. As shown in FIG. 1, the multimedia information playing system 1 may include: n acquisition devices 10, a standardized server 11, a live broadcast terminal 12 and a playing terminal 13, wherein n is an integer more than or equal to 2, and in FIG. 1, n is, for example, equal to 2. Both the live broadcast terminal 12 and the playing terminal 13 may log in the standardized server 11 to establish communication connections with the standardized server 11, and the live broadcast terminal 12 may also establish a communication connection with each of acquisition devices in the n acquisition devices 10.

Exemplarily, the communication connections established between the acquisition devices 10, the standardized server 11, the live broadcast terminal 12 and the playing terminal 13 may be established through a wired network, and may also be established through a wireless network, which is not limited in the aspect of the present disclosure, wherein the wired network may include, but not limited to: a Universal Serial Bus (USB), and the wireless network may include, but not limited to: Wireless Fidelity (WIFI), Bluetooth (BT), infrared, Zigbee, data and the like.

Figure 2:
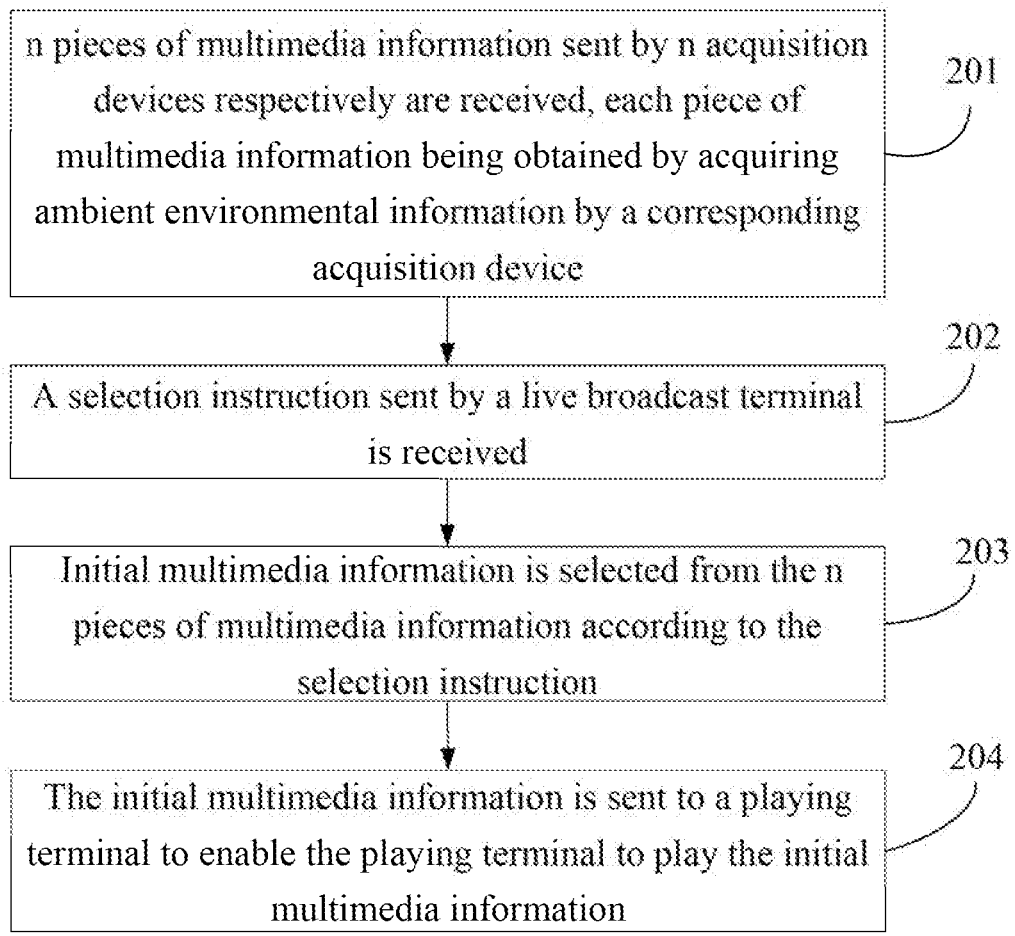
FIG. 2 is a flow chart showing a multimedia information playing method according to an exemplary aspect of the present disclosure.

FIG. 2 is a flow chart showing a multimedia information playing method according to an exemplary aspect. The multimedia information playing method may be applied to a standardized server 11 in a multimedia information playing system 1 shown in FIG. 1. As shown in FIG. 2, the multimedia information playing method may include the following steps.

In Step 201, n pieces of multimedia information sent by n acquisition devices respectively are received, each piece of multimedia information being obtained by acquiring ambient environmental information by a corresponding acquisition device.

In Step 202, a selection instruction sent by a live broadcast terminal is received.

In Step 203, initial multimedia information is selected from the n pieces of multimedia information according to the selection instruction.

In Step 204, the initial multimedia information is sent to a playing terminal to enable the playing terminal to play the initial multimedia information.

From the above, in the multimedia information playing method provided by the aspect of the present disclosure, the standardized server may select the initial multimedia information to be live broadcast by a host from the multimedia information, acquired by the n acquisition devices, of different viewing angles according to the selection instruction sent by the live broadcast terminal and send the initial multimedia information to the playing terminal to enable the playing terminal to play the multimedia information of different viewing angles, so that a multimedia information playing effect is improved.

Optionally, the multimedia information playing method may further include that:

a changing instruction sent by the live broadcast terminal is received;

target multimedia information is selected from the n pieces of multimedia information according to the changing instruction; and multimedia information sent to the playing terminal is changed from the initial multimedia information to the target multimedia information, and the target multimedia information is sent to the playing terminal to enable the playing terminal to play the target multimedia information.

Optionally, the standardized server has at least three network addresses, and the multimedia information playing method may further include that:

a live broadcast request of the live broadcast terminal is received, the live broadcast request containing the number n of the acquisition devices;

n first network addresses and a second network address are selected from the at least three network addresses of the standardized server respectively, the n first network addresses and the second network address indicating different storage modules in the standardized server respectively;

the n first network addresses are sent to the live broadcast terminal to enable the live broadcast terminal to send the n first network addresses to the n acquisition devices respectively; and Step 201 may include that:

multimedia information sent by the n acquisition devices according to the n first network addresses respectively is received.

Optionally, the multimedia information playing method may further include that:

the n pieces of multimedia information are stored in the storage modules indicated by the n first network addresses respectively;

first standardized processing is performed on the n pieces of multimedia information, parameters of the n pieces of multimedia information subjected to the first standardized processing being consistent with a playing parameter of the live broadcast terminal; and the n pieces of multimedia information subjected to the first standardized processing are sent to the live broadcast terminal to enable the live broadcast terminal to simultaneously play the n pieces of multimedia information subjected to the first standardized processing and generate the selection instruction according to an operation of a user.

Optionally, the multimedia information playing method may further include that:

second standardized processing is performed on the initial multimedia information, the parameter of the initial multimedia information subjected to the second standardized processing being consistent with a playing parameter of the playing terminal;

the initial multimedia information subjected to the second standardized processing is stored into the storage module indicated by the second network address;

a playing request of the playing terminal is received, the playing request containing the second network address;

Step 204 may include that:

the initial multimedia information subjected to the second standardized processing is acquired from the storage module indicated by the second network address; and the initial multimedia information subjected to the second standardized processing is sent to the playing terminal by using a live broadcast delivery mechanism and a CDN mechanism.

Optionally, a format of the multimedia information acquired by each acquisition device is: an HDMI format or an SDI format.

Optionally, the Step 201 may include that:

the n pieces of multimedia information sent by the n acquisition devices respectively are received on the basis of an RTMP.

From the above, in the multimedia information playing method provided by the aspect of the present disclosure, the n acquisition devices may acquire the multimedia information of different viewing angles respectively, and the standardized server may select the initial multimedia information to be live broadcast by the host from the multimedia information of different viewing angles according to the selection instruction sent by the live broadcast terminal and send the initial multimedia information to the playing terminal to enable the playing terminal to play the multimedia information of different viewing angles, so that the multimedia information playing effect is improved.

Figure 3:
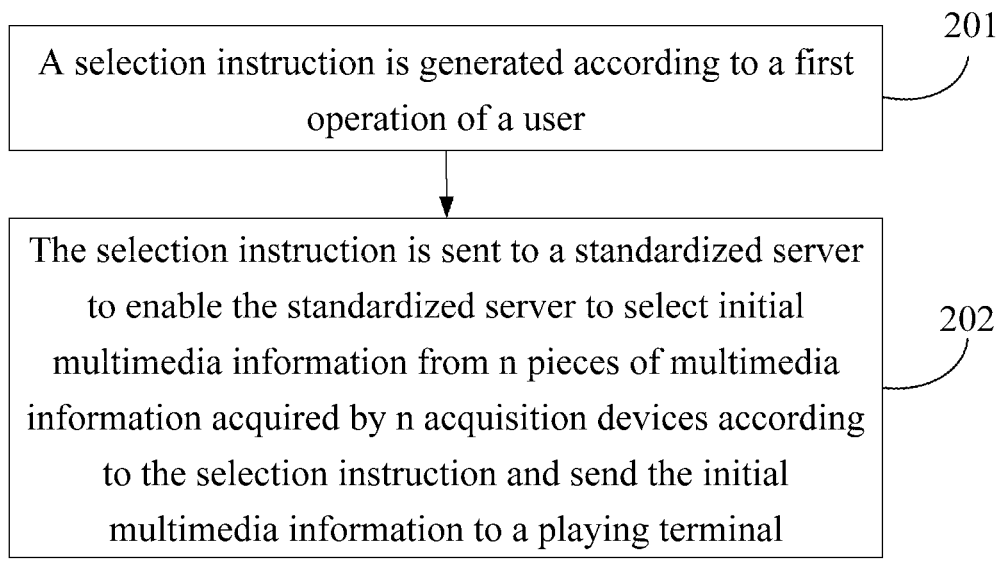
FIG. 3 is a flow chart showing another multimedia information playing method according to an exemplary aspect of the present disclosure.

FIG. 3 is a flow chart showing another multimedia information playing method according to an exemplary aspect. The multimedia information playing method may be applied to a live broadcast terminal 12 in a multimedia information playing system 1 shown in FIG. 1, and as shown in FIG. 3, the multimedia information playing method may include the following steps.

In Step 301, a selection instruction is generated according to a first operation of a user.

In Step 302, the selection instruction is sent to a standardized server to enable the standardized server to select initial multimedia information from n pieces of multimedia information acquired by n acquisition devices according to the selection instruction and send the initial multimedia information to a playing terminal.

From the above, in the multimedia information playing method provided by the aspect of the present disclosure, the n acquisition devices may acquire the multimedia information of different viewing angles respectively, and the live broadcast terminal may send the selection instruction to the standardized server when generating the selection instruction according to the first operation of the user to enable the standardized server to select the initial multimedia information to be live broadcast by a host from the multimedia information of different viewing angles according to the selection instruction sent by the live broadcast terminal and send the initial multimedia information to the playing terminal to enable the playing terminal to play the multimedia information of different viewing angles, so that a multimedia information playing effect is improved.

Optionally, the multimedia information playing method may further include that:

a changing instruction is generated according to a second operation of the user; and the changing instruction is sent to the standardized server to enable the standardized server to change multimedia information sent to the playing terminal from the initial multimedia information to target multimedia information according to the changing instruction.

Optionally, the standardized server has at least three network addresses, and the multimedia information playing method may further include that:

before the selection instruction is sent to the standardized server, a live broadcast request is sent to the standardized server, the live broadcast request containing the number n of the acquisition devices, to enable the standardized server to select n first network addresses and a second network address from the at least three network addresses of the standardized server respectively;

the n first network addresses sent by the standardized server are received; and the n first network addresses are sent to the n acquisition devices respectively to enable each of the n acquisition devices to send the multimedia information to the standardized server according to the received first network addresses after acquiring the multimedia information.

Optionally, the multimedia information playing method may further include that:

n pieces of multimedia information subjected to first standardized processing ore received from the standardized server, the n pieces of multimedia information being stored in n storage modules indicated by the n first network addresses respectively; and the n pieces of multimedia information subjected to the first standardized processing are synchronously played on a user interface.

Optionally, a format of the multimedia information acquired by each of the n acquisition devices is: an HDMI format or an SDI format.

From the above, in the multimedia information playing method provided by the aspect of the present disclosure, the n acquisition devices may acquire the multimedia information of different viewing angles respectively, and the live broadcast terminal may send the selection instruction to the standardized server when generating the selection instruction according to the first operation of the user to enable the standardized server to select the initial multimedia information to be live broadcast by the host from the multimedia information of different viewing angles according to the selection instruction sent by the live broadcast terminal and send the initial multimedia information to the playing terminal to enable the playing terminal to play the multimedia information of different viewing angles, so that the multimedia information playing effect is improved.

Figure 4A:
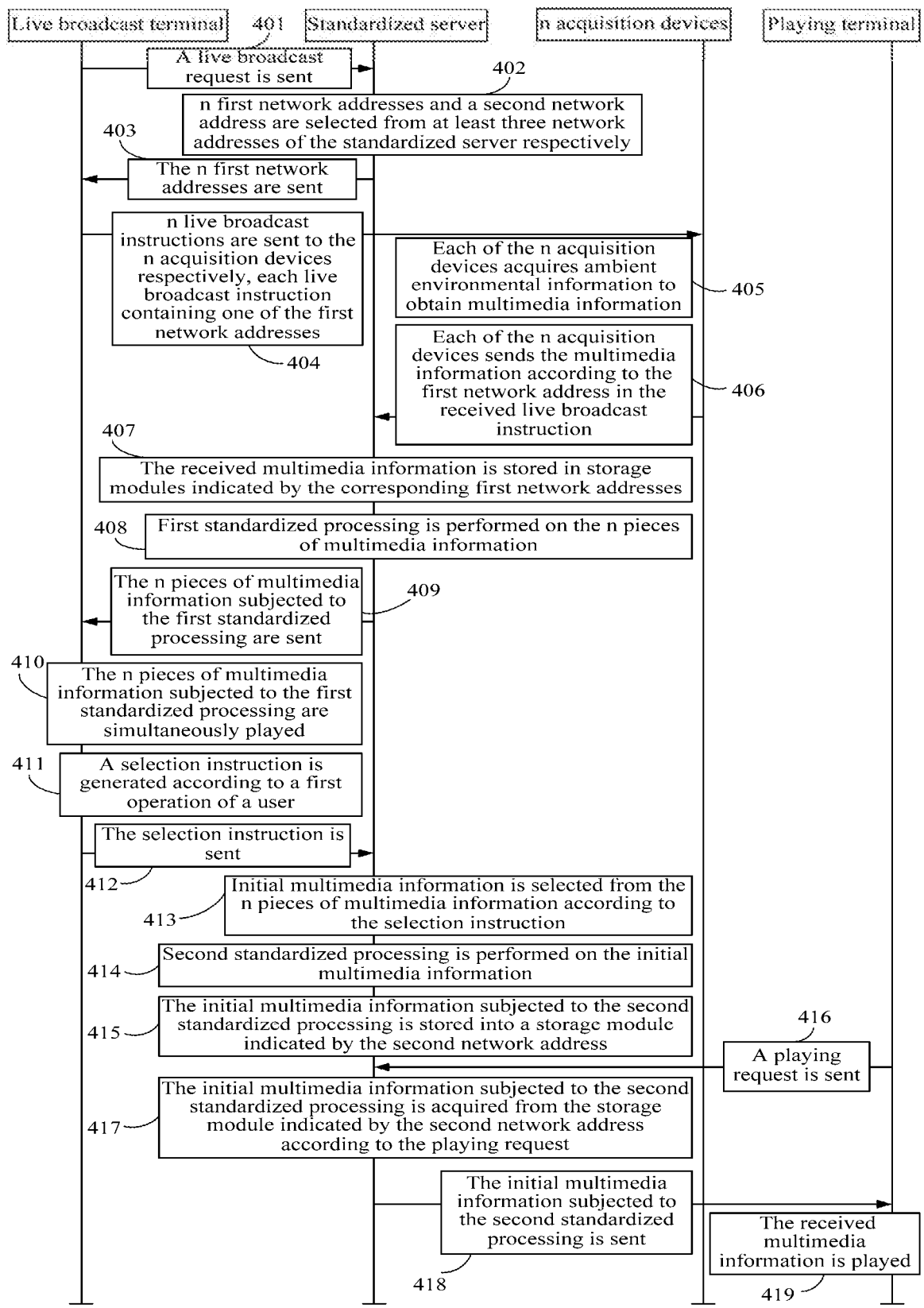
FIG. 4A is a flow chart showing another multimedia information playing method according to an exemplary aspect of the present disclosure.

FIG. 4A is a flow chart showing another multimedia information playing method according to an exemplary aspect. The multimedia information playing method may be applied to a multimedia information playing system 1 shown in FIG. 1. As shown in FIG. 4A, the multimedia information playing method may include the following steps.

In Step 401, a live broadcast terminal sends a live broadcast request to a standardized server.

Figure 5A:
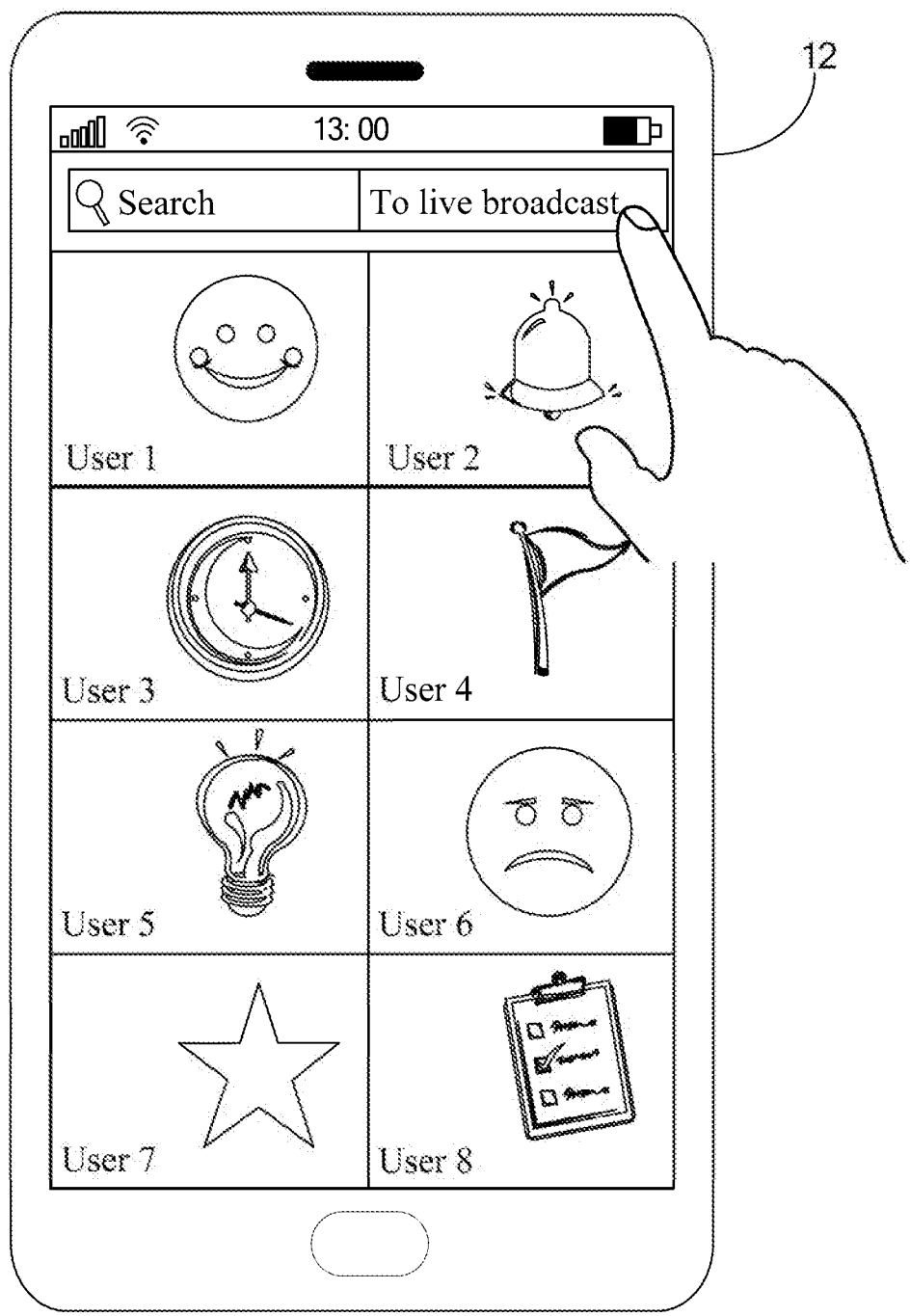
FIG. 5A is a schematic diagram illustrating a user interface according to an exemplary aspect of the present disclosure.

Exemplarily, the live broadcast request contains the number n of acquisition devices, and a host may log in the standardized server through the live broadcast terminal and establish a communication connection with the standardized server after logging in the standardized server. At this moment, a user interface of the live broadcast terminal 12 may be shown in FIG. 5A, a "to live broadcast" button may be displayed on the user interface of the live broadcast terminal 12, and when a user is intended to live broadcast, the "to live broadcast" button may be directly clicked, thereby triggering the live broadcast terminal to send the live broadcast request to the standardized server.

Furthermore, a live broadcast user and a live broadcast image (such as a picture or a video) related to the user may also be displayed on the user interface of the live broadcast terminal 12. Exemplarily, FIG. 5A only shows 8 live broadcast users and a live broadcast image related to each of the 8 users on the user interface as an example. A search box may also be displayed on the user interface of the live broadcast terminal 12, that is, when being intended to watch live broadcast of another user, the user may directly click the search box and input an identifier (such as a username) of the other user in the search box, and then the terminal may directly display the live broadcast of the other user.

It is important to note that the number n of acquisition devices which establish a communication connection with the live broadcast terminal may be preset on the live broadcast terminal, or, the live broadcast terminal may determine the number n of the acquisition devices according to input of a user.

In Step 402, the standardized server selects n first network addresses and a second network address from at least three network addresses of the standardized server respectively.

Exemplarily, multiple (at least three) storage modules may be arranged on the standardized server, each storage module has a network address, and the at least three network addresses of the standardized server are the network addresses of the at least three storage modules on the standardized server. After receiving the live broadcast request sent by the live broadcast terminal, the standardized server may determine the number n of the acquisition devices according to the live broadcast request, and then may directly select the n first network addresses and the second network address from the at least three network addresses of the standardized server by using a preset method respectively, the first network addresses and the second network address indicating different storage modules in the standardized server respectively. Optionally, the preset method may be a random selection method, and may also be another selection method, which is not limited in the aspect of the present disclosure.

Furthermore, after the standardized server screens the n first network addresses and the second network address, the standardized server may also establish a relationship among a live broadcast terminal, n first network addresses and a second network address on the standardized server. Exemplarily, a relationship, obtained by the standardized server, among a live broadcast user, n first network addresses and a second network address may be shown in Table 1, and a live broadcast user M corresponds to n first network addresses (A1, A2 . . . An) and a second network address X1, which indicates that: after the live broadcast user M logs in the standardized server, the standardized server allocates the n first network addresses (A1, A2 . . . An) and the second network address X1 to the live broadcast user M and sends the n first network addresses (A1, A2 . . . An) to a live broadcast terminal used by the live broadcast user M.

TABLE 1

| Live broadcast user | n first network addresses | Second network address |
|---|---|---|
| M | A1 . . . An | X1 |

In Step 403, the standardized server sends the n first network addresses to the live broadcast terminal.

After screening the n first network addresses, the standardized server may directly send the screened n first network addresses to the live broadcast terminal. For example: the standardized server may generate a message including the n first network addresses according to the screened n first network addresses and send the message including the n first network addresses to the live broadcast terminal by using a certain communication protocol.

In Step 404, the live broadcast terminal sends n live broadcast instructions to n acquisition devices respectively, each live broadcast instruction containing a first network address.

After the live broadcast terminal receives the n first network addresses sent by the standardized server, the live broadcast terminal may allocate the n first network addresses to the n acquisition devices respectively, that is, the live broadcast terminal may allocate a first network address to each acquisition device, and the first network addresses allocated to any two live broadcast terminals are different from each other. Then, the live broadcast terminal may send the first network addresses allocated to the acquisition device to the corresponding acquisition device. Exemplarily, the live broadcast terminal may generate, according to the first network address required to be sent to certain acquisition device, the live broadcast instruction containing the first network address and send the live broadcast instruction containing the first network address to the corresponding acquisition device.

In Step 405, each of the n acquisition devices acquires ambient environmental information to obtain multimedia information.

Exemplarily, each of the n acquisition devices may include an acquisition module, and in Step 405, each acquisition device may acquire the ambient environmental information around the acquisition module through the acquisition module, thereby obtaining the multimedia information. The n acquisition devices may acquire n pieces of multimedia information.

It is important to note that the multimedia information acquired by the n acquisition devices may be multimedia information corresponding to the same object from different viewing angles. For example, the multimedia information acquired by a certain acquisition device is multimedia information of a left viewing angle of a first object, and the multimedia information acquired by another acquisition device is multimedia information of a right viewing angle of the first object.

Optionally, the multimedia information acquired by the n acquisition devices may also be multimedia information corresponding to different objects. For example: the multimedia information acquired by a certain acquisition device is multimedia information of the first object, and multimedia information acquired by another acquisition device is multimedia information of a second object. There are no limits made in the aspect of the present disclosure.

The acquisition modules in the aspect of the present disclosure may be professional photographic modules, and a format of the multimedia information acquired by them may be: an HDMI format or an SDI format.

In Step 406, each of the n acquisition devices sends the multimedia information to the standardized server according to the first network address in the received live broadcast instruction.

Optionally, each acquisition device may further include: a coding module and a sending module, and the acquisition module, coding module and sending module in the acquisition device are connected with each other. In Step 405, after each acquisition device acquires the multimedia information through the acquisition module, each acquisition module may directly send the multimedia information to the coding module.

The coding module may directly code the multimedia information after receiving the multimedia information. Exemplarily, the multimedia information may include video information and audio information, wherein a format of the coded video information may be an H.264 format which is a new-generation digital video compression format, and a format of the coded audio information may be an Advanced Audio Coding (ACC) format.

The coding module may send the coded multimedia information to the sending module after coding the multimedia information. Exemplarily, the sending module may be module capable of transmitting information on the basis of an RTMP. After receiving the coded multimedia information, the sending module may send the coded multimedia information to the standardized server according to the first network address in the live broadcast instruction received by the acquisition device where the coding module is located. Optionally, the sending module may send the coded multimedia information to the storage module indicated by the first network address on the standardized server according to the first network address. It is important to note that the standardized server may also receive the coded multimedia information sent by the sending module on the basis of the RTMP. The coded multimedia information may contain the first network address.

That is, the sending module in each acquisition device may send the multimedia information to the standardized server to enable the standardized server to receive the n pieces of multimedia information sent by the n acquisition devices.

In Step 407, the standardized server stores the received multimedia information in storage modules indicated by the corresponding first network addresses.

Optionally, the coded multimedia information sent to the standardized server by each sending module in Step 406 may further include the first network address received by the acquisition device where the sending module is located, and after receiving the coded multimedia information sent by each acquisition device through the sending module, the standardized server may directly store (cache) the received coded multimedia information in the storage module indicated by the first network address in the multimedia information.

In Step 408, the standardized server performs first standardized processing on the n pieces of multimedia information.

Parameters of the n pieces of multimedia information subjected to the first standardized processing are consistent with a playing parameter of the live broadcast terminal. After storing the n pieces of coded multimedia information, the standardized server may start performing the first standardized processing on the n pieces of coded multimedia information to make the multimedia information subjected to the first standardized processing applicable to the live broadcast terminal. Optionally, each piece of multimedia information subjected to the first standardized processing may contain the first network address related to the multimedia information.

Exemplarily, the standardized server may decode the n pieces of coded multimedia information at first to obtain n pieces of decoded multimedia information. Then, the standardized server may determine a target value to which the parameter of each piece of coded multimedia information is required to be regulated according to the playing parameter of the live broadcast terminal and the number n of the coded multimedia information, and performs the first standardized processing on the decoded multimedia information to make the parameters of the n pieces of multimedia information subjected to the first standardized processing consistent with the playing parameter (such as a resolution and a frequency) of the live broadcast terminal. Therefore, the live broadcast terminal may simultaneously display the n pieces of multimedia information subjected to the first standardized processing on the live broadcast terminal after receiving the n pieces of multimedia information subjected to the first standardized processing.

It is important to note that: since the acquisition device in the aspect of the present disclosure is professional acquisition device, a resolution of video information acquired by the professional acquisition device is relatively high, frequencies of the video and audio information are also relatively high, while a resolution of video information played by the live broadcast terminal (such as a mobile phone) is relatively low and frequencies of the video and audio information are relatively low, for enabling the live broadcast terminal to simultaneously play the n pieces of multimedia information, it is necessary to regulate a size of each piece of multimedia information on a display screen of the live broadcast terminal. When performing the first standardized processing on each piece of multimedia information, the standardized server may regulate the resolution and frequency of each piece of multimedia information to make the parameters of the n pieces of multimedia information subjected to the first standardized processing and the playing parameter of the live broadcast terminal within the same range to smoothly and synchronically play the n pieces of multimedia information subjected to the first standardized processing on the live broadcast terminal.

In Step 409, the standardized server sends the n pieces of multimedia information subjected to the first standardized processing to the live broadcast terminal.

It is important to note that: after the standardized server receives each piece of multimedia information, the standardized server may query a list (such as Table 1) which is pre-established, thereby determining that the multimedia information and the acquisition device sending the multimedia information are related to live broadcast device in the list. Furthermore, the n pieces of multimedia information subjected to the first standardized processing may be directly sent to the five broadcast terminal after the first standardized processing is performed on the n pieces of multimedia information.

In Step 410, the live broadcast terminal simultaneously plays the n pieces of multimedia information subjected to the first standardized processing.

Figure 5B:
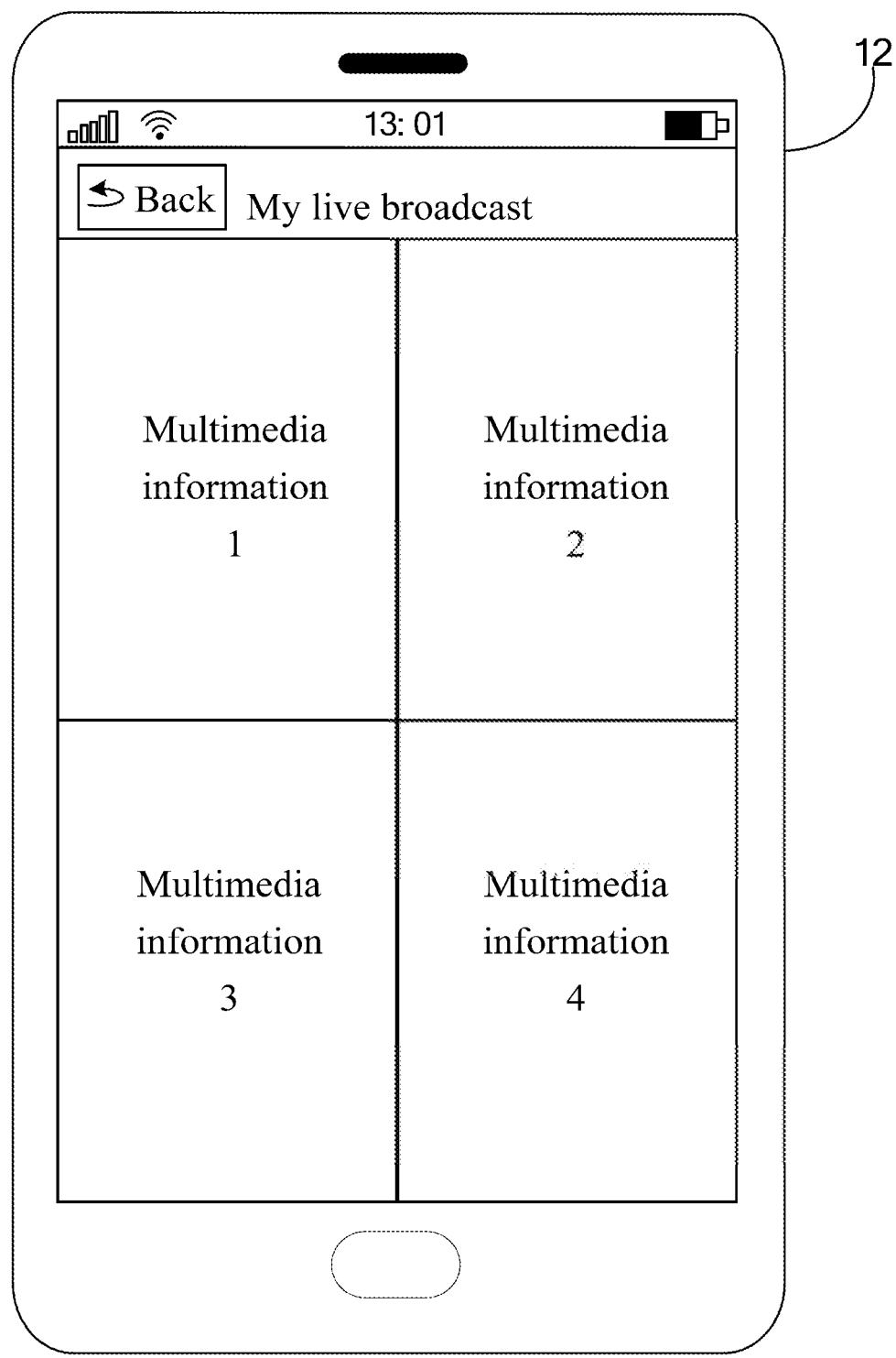
FIG. 5B is a schematic diagram illustrating another user interface according to an exemplary aspect of the present disclosure.

After receiving the n pieces of multimedia information subjected to the first standardized processing from the standardized server, the live broadcast terminal may simultaneously display the n pieces of multimedia information. At this moment, the user interface of the live broadcast terminal may be shown in FIG. 5B. For example, in the aspect of the present disclosure, the live broadcast terminal 12 is simultaneously connected with four acquisition devices. In this case, the live broadcast terminal may receive four pieces of multimedia information (multimedia information 1, multimedia information 2, multimedia information 3 and multimedia information 4 respectively) subjected to the first standardized processing from the standardized server, the live broadcast terminal 12 may simultaneously play the four pieces of multimedia information, and each piece of multimedia information may be obtained by superposing video information and audio information. That is, in Step 410, the live broadcast terminal 12 may simultaneously play four pieces of video information and four pieces of audio information.

Exemplarily, the five broadcast terminal may be a mobile phone or a computer, the user may log in the standardized server for live broadcast on live broadcast software on the mobile phone or the computer. Moreover, in Step 410, the live broadcast software on the mobile phone or the computer may simultaneously play the n pieces of multimedia information. Or, the user may log in the standardized server in a webpage on the mobile phone or the computer, and the n pieces of multimedia information are simultaneously played in the webpage by using a flash (i.e., a solid stale memory and an animation editor).

In Step 411, the live broadcast terminal generates a selection instruction according to a first operation of a user.

When the live broadcast terminal simultaneously display the n pieces of multimedia information, the user may execute the first operation on the live broadcast terminal, thereby triggering the live broadcast terminal to generate the selection instruction. It is important to note that the selection instruction may include the first network address related to multimedia information selected by the user (the first network address is configured to indicate the storage module of the multimedia information on the standardized server).

Figure 5C:
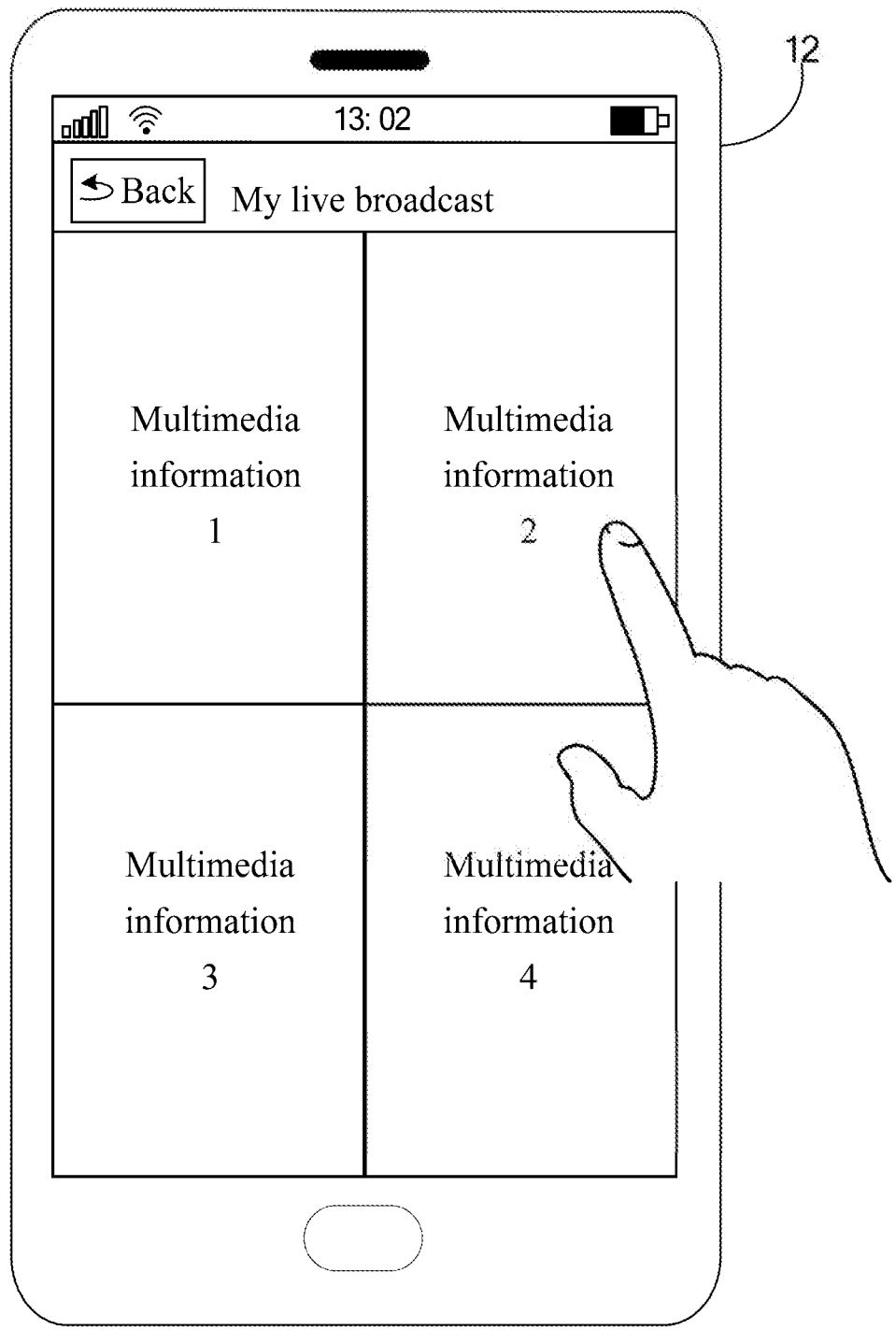
FIG. 5C is a schematic diagram illustrating another user interface according to an exemplary aspect of the present disclosure.

Exemplarily, as shown in FIG. 5C, the live broadcast terminal may be a mobile phone, and when the n pieces of multimedia information are simultaneously played on the mobile phone, the user (host) may click a piece of multimedia information (such as the multimedia information 2) on the mobile phone, thereby triggering the mobile phone to generate a selection instruction including the first network address related to the multimedia information 2. The live broadcast terminal may also be a computer, and when the n pieces of multimedia information are simultaneously played on the computer, the user may click a certain piece of multimedia information (such as the multimedia information 2) in the n pieces of multimedia information through a mouse, thereby triggering the computer to generate the selection instruction including the first network address related to the multimedia information 2.

In Step 412, the live broadcast terminal sends the selection instruction to the standardized server.

After the live broadcast terminal generates the selection instruction, the live broadcast terminal may directly send the selection instruction to the standardized server.

In Step 413, the standardized server selects initial multimedia information from the m pieces of multimedia information according to the selection instruction.

After receiving the selection instruction sent by the live broadcast terminal, the standardized server may parse the selection instruction, thereby determining the multimedia information selected by the user and the first network address related to the multimedia information. Furthermore, the multimedia information stored at the first network address on the standardized server is determined as the initial multimedia information.

In Step 414, the standardized server performs second standardized processing on the initial multimedia information.

The parameter of the initial multimedia information subjected to the second standardized processing is consistent with a playing parameter of a playing terminal. After determining the initial multimedia information, the standardized server may start processing the initial multimedia information to make the processed initial multimedia information applicable to the playing terminal. Exemplarily, the standardized server may decode the initial multimedia information coded in Step 408 to obtain decoded initial multimedia information. Then, the standardized server may perform the second standardized processing on the decoded initial multimedia information to make the parameter of the initial multimedia information subjected to the second standardized processing consistent with the playing parameter (such as a resolution and a frequency) of the playing terminal.

In Step 415, the standardized server stores the initial multimedia information subjected to the second standardized processing into a storage module indicated by the second network address.

After performing the second standardized processing on the initial multimedia information, the standardized server may further directly store the initial multimedia information subjected to the second standardized processing into the storage module indicated by the second network address which is preselected.

It is important to note that the initial multimedia information subjected to the second standardized processing is only cached on the storage module indicated by the second network address and the standardized server may directly delete the initial multimedia information subjected to the second standardized processing on the storage module indicated by the second network address or send the initial multimedia information subjected to the second standardized processing to another server after the initial multimedia information subjected to the second standardized processing is cached on the storage module indicated by the second network address for a preset time.

Optionally, after the standardized server determines the initial multimedia information, the standardized server may also extend the pre-established relationship (shown in Table 1) (to obtain a relationship among a live broadcast user, n first network addresses, a second network address and a target network address, and the target network address is the first network address related to the initial multimedia information in the n first network addresses.

Exemplarily, the relationship, obtained by the standardized server, among the live broadcast user, the n first network addresses, the second network address and the target network address may be shown in Table 2. Exemplarily, a live broadcast user M corresponds to n first network addresses (A1 . . . An), a second network address X1 and a target network address A5, which indicates that: after the live broadcast user M logs in the standardized server, the standardized server allocates the n first network addresses (A1 . . . An) to the live broadcast user M, and the standardized server selects the target network address A5 from the n first network addresses according to the selection instruction and determines the multimedia information on the storage module indicated by the target network address A5 as the initial multimedia information. After performing the second standardized processing on the initial multimedia information, the standardized server may store the initial multimedia information into the storage module indicated by the second network address X1.

TABLE 2

| Live broadcast user | n first network addresses | Second network address | Target network address |
| --- | --- | --- | --- |
| M | A1 . . . An | X1 | A5 |

In Step 416, a playing terminal sends a playing request to the standardized server.

Figure 5D:
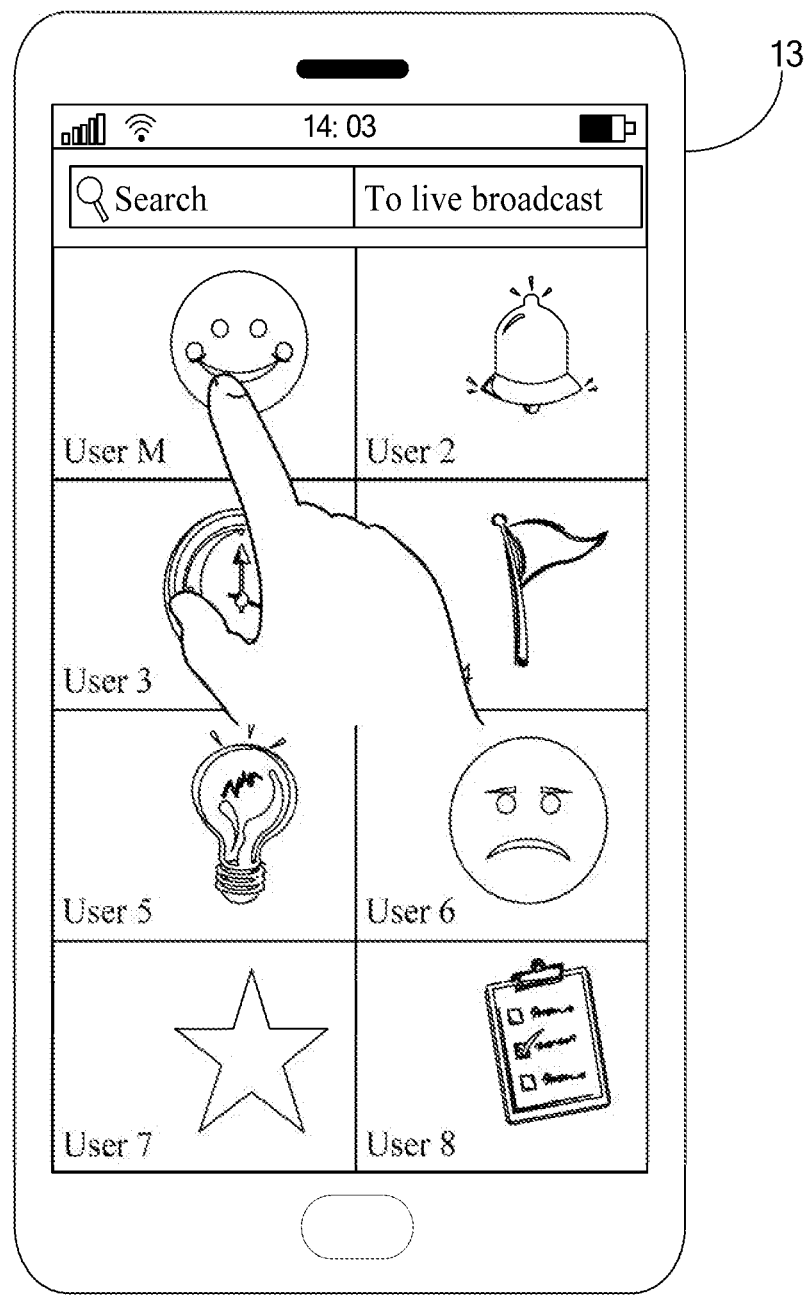
FIG. 5D is a schematic diagram illustrating another user interface according to an exemplary aspect of the present disclosure.

The playing request contains the second network address. A viewer may also log in the standardized server through the playing terminal and establish a communication connection with the standardized server after logging in the standardized server. A user interface of the playing terminal 13 may be shown in FIG. 5D. When the host (i.e. the live broadcast user) in the aspect of the present disclosure is the live broadcast user M, the viewer may directly click an area where the live broadcast user M is located on the user interlace in the user interface. The viewer may click the area where the live broadcast user M is located on the user interface to trigger the playing terminal to generate the playing request containing the second network address and send the playing request to the standardized server.

In Step 417, the standardized server acquires the initial multimedia information subjected to the second standardized processing from the storage module indicated by the second network address according to the playing request.

Exemplarily, after receiving the playing request of the playing terminal, the standardized server may extract the second network address from the playing request and acquire the multimedia information subjected to the standardized processing from the storage module indicated by the second network address.

In Step 418, the standardized server sends the initial multimedia information subjected to the second standardized processing to the playing terminal.

The standardized server may further code the multimedia information cached on the storage module indicated by the second network address (the initial multimedia information subjected to the second standardized processing) for real-time sending to the playing terminal. Optionally, after multiple playing terminals simultaneously send playing requests containing the second network address to the standardized server, the standardized server may simultaneously send the initial multimedia information subjected to the second standardized processing to the multiple playing terminals by using a live broadcast delivery mechanism and a CDN mechanism.

In Step 419, the playing terminal plays the received multimedia information.

Figure 5E:
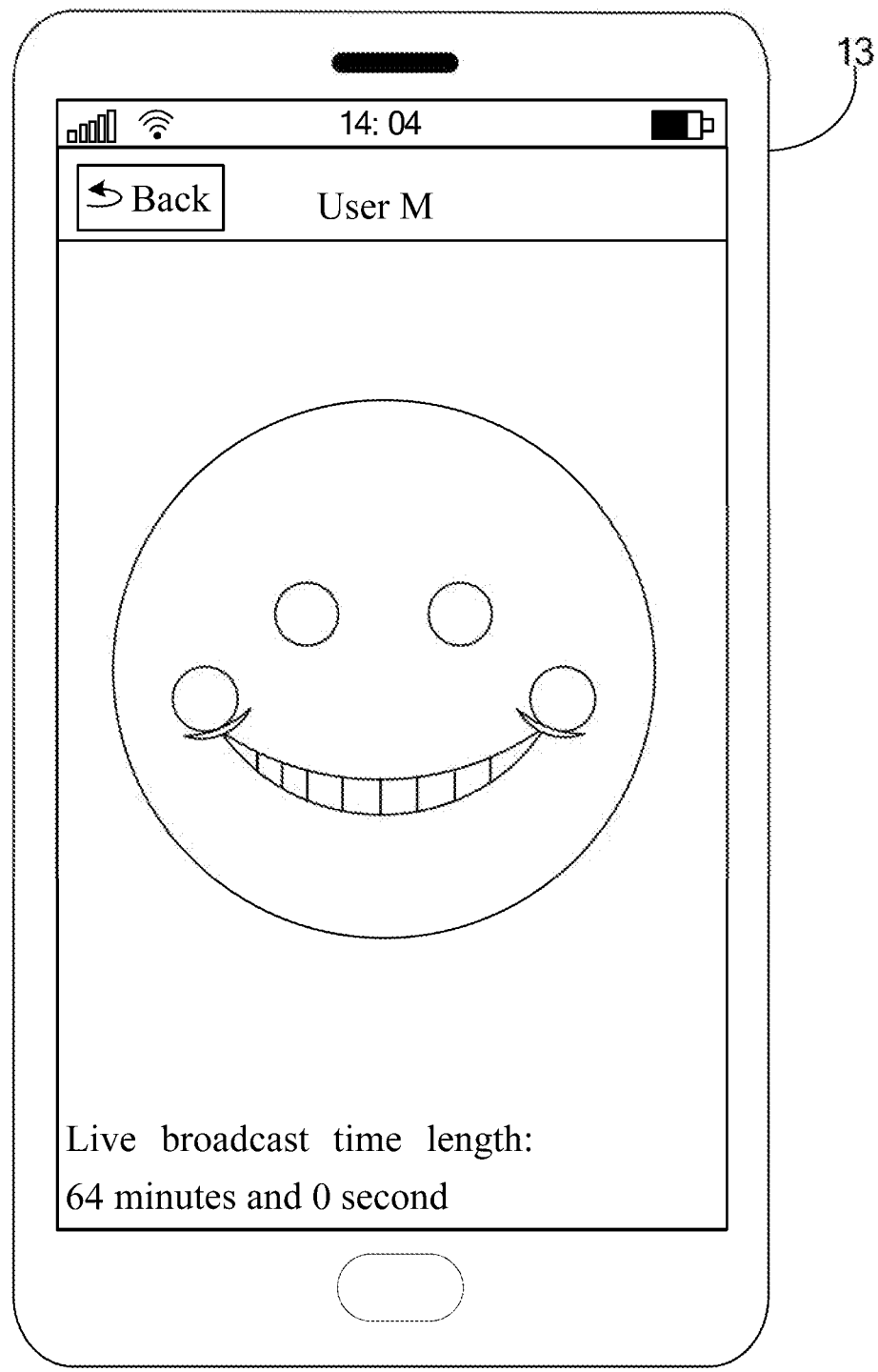
FIG. 5E is a schematic diagram illustrating a user interlace according to another exemplary aspect of the present disclosure.

The playing terminal may play the received multimedia information after receiving the multimedia information. Exemplarily, at this moment, the user interface of the playing terminal 13 may be shown in FIG. 5E. At this moment, the host is the live broadcast user M, and a current lime length for which the live broadcast user M has live broadcast may also be displayed on the user interface, for example, the live broadcast user M starts live broadcasting at 13:00. When the viewer starts playing the multimedia information live broadcast by the live broadcast user M at four past fourteen via the playing terminal, 64 minutes and 0 second for which the live broadcast user M has live broadcast may be displayed on the user interface of the playing terminal of the viewer.

It is important to note that: in a live broadcast process of the live broadcast user M, the standardized server may store the first network address related to the initial multimedia information, monitor whether the storage module indicated by the first network address receives multimedia information or not in real time, determine the multimedia information received by the storage module indicated by the first network address also as initial multimedia information, perform decoding, second standardized processing and coding on the initial multimedia information, store it to the second network address and send the initial multimedia information on the storage module indicated by the second network address to the playing terminal.

Figure 4B:
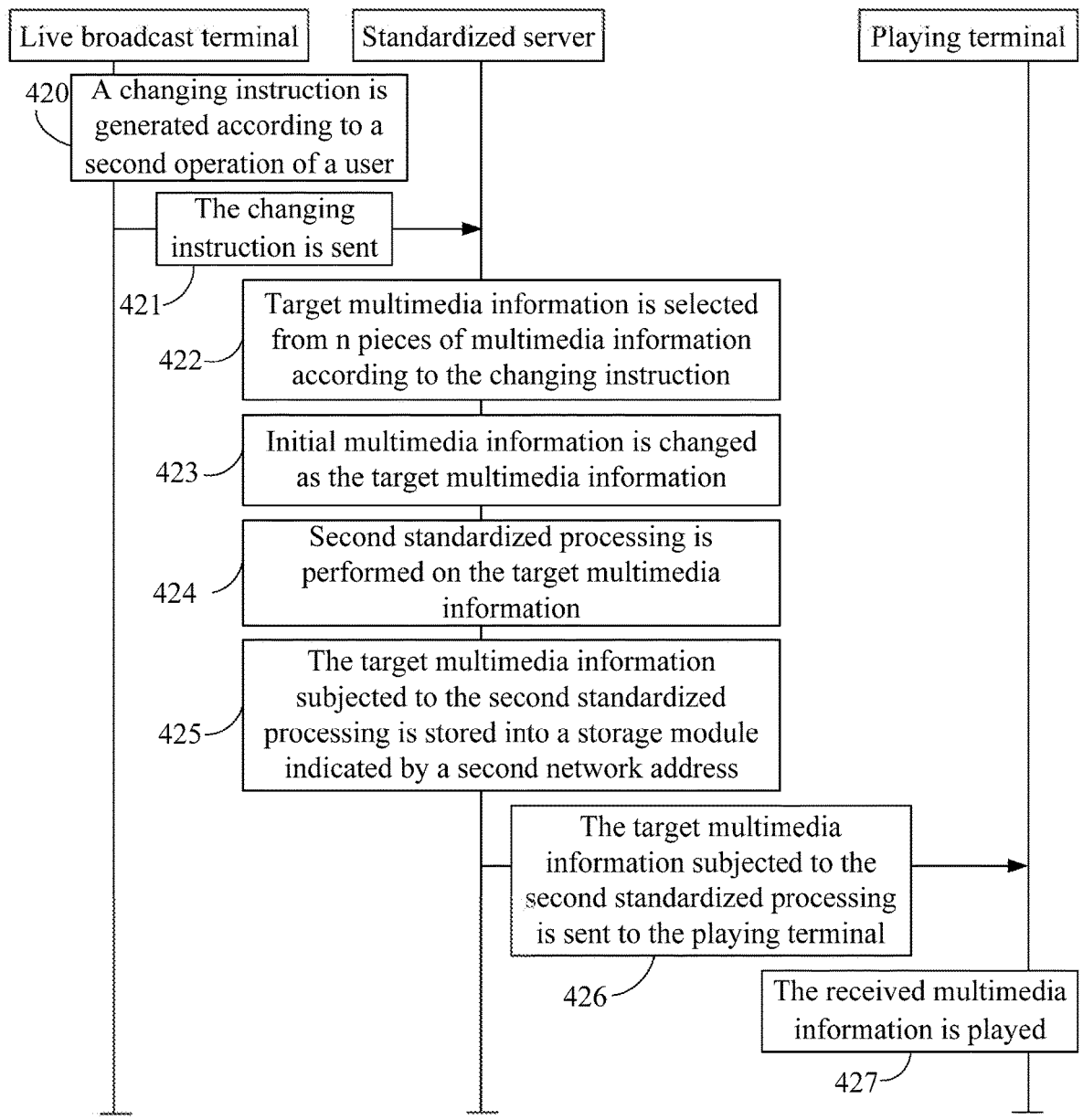
FIG. 4B is a flow chart showing another multimedia information processing method according to an exemplary aspect of the present disclosure.

Furthermore, FIG. 4B is a flow chart showing another multimedia information playing method according to an exemplary aspect. As shown in FIG. 4B, after Step 419, the multimedia information playing method may further include the following steps.

In Step 420, the live broadcast terminal generates a changing instruction according to a second operation of the user.

Exemplarily, the live broadcast terminal may simultaneously play the n pieces of multimedia information in real time, and the user may execute the second operation over the live broadcast terminal, thereby triggering the live broadcast terminal to generate the changing instruction. It is important to note that the changing instruction may include the first network address related to multimedia information selected by the user (the first network address is configured to indicate the storage module of the multimedia information on the standardized server).

Figure 5F:
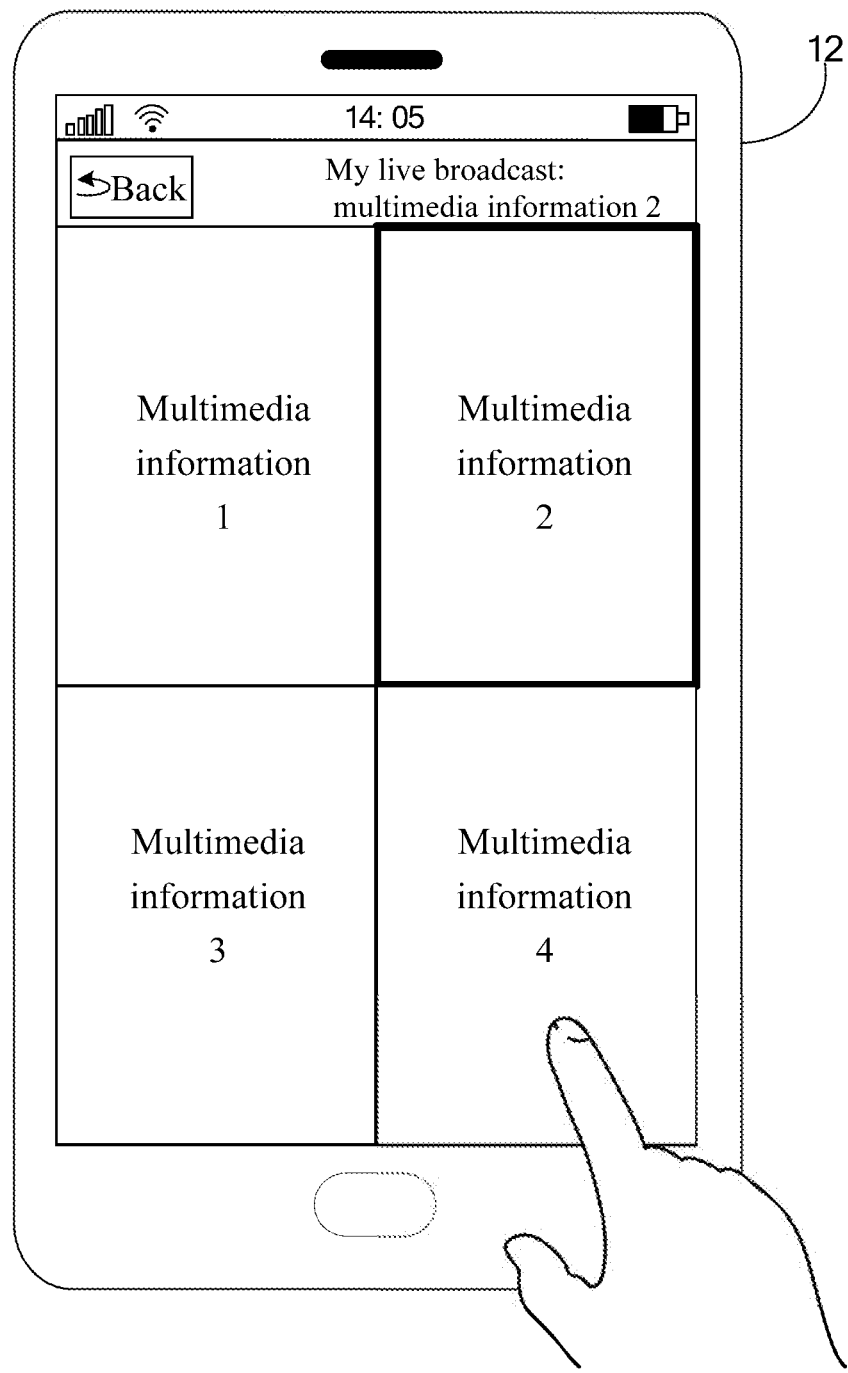
FIG. 5F is a schematic diagram illustrating another use interface according to another exemplary aspect of the present disclosure.

Exemplarily, as shown in FIG. 5F, it is displayed on the live broadcast terminal that the multimedia information currently played on the playing terminal is the multimedia information 2, and if the user (the host) is required to change the currently played multimedia information at this moment, the user may click any piece of multimedia information (such as the multimedia information 4) except the multimedia information 2 on the live broadcast terminal, thereby triggering the live broadcast terminal to generate the changing instruction including the first network address related to the multimedia information 4.

In Step 421, the live broadcast terminal sends the changing instruction to the standardized server.

After the live broadcast terminal generates the changing instruction, the live broadcast terminal may directly send the changing instruction to the standardized server.

In Step 422, the standardized server selects target multimedia information from the n pieces of multimedia information according to the changing instruction.

After receiving the changing instruction sent by the live broadcast terminal, the standardized server may parse the changing instruction, thereby determining the multimedia information selected by the user and the first network address related to the multimedia information. Furthermore, the multimedia information stored on the storage module indicated by the first network address on the standardized server is determined as the target multimedia information.

In Step 423, the standardized server changes the initial multimedia information into the target multimedia information.

Exemplarily, the standardized server may change the initial multimedia information into the target multimedia information through FFmpeg (a multimedia video processing tool), that is, the first network address related to the pre-stored initial multimedia information is changed into the first network address related to the target multimedia information, and multimedia information received by the storage module indicated by the first network address related to the target multimedia information is also determined as target multimedia information.

In Step 424, the standardized server performs the second standardized processing on the target multimedia information.

After determining the target multimedia information, the standardized server may start processing the target multimedia information to make the processed target multimedia information applicable to the playing terminal. Exemplarily, the standardized server may decode the target multimedia information at first to obtain decoded target multimedia information. Then, the standardized server may perform the second standardized processing on the decoded target multimedia information to make the parameter of the target multimedia information subjected to the second standardized processing consistent with the playing parameter (such as the resolution and the frequency) of the playing terminal.

In Step 425, the standardized server stores the target multimedia information subjected to the second standardized processing into the storage module indicated by the second network address.

After performing the second standardized processing on the target multimedia information, the standardized server may further directly store the target multimedia information subjected to the second standardized processing into the storage module indicated by the second network address which is preselected.

In Step 426, the standardized server sends the target multimedia information subjected to the second standardized processing to the playing terminal.

The standardized server may further code the multimedia information cached on the storage module indicated by the second network address (the target multimedia information subjected to the second standardized processing) for real-time sending to the playing terminal.

In Step 427, the playing terminal plays the received multimedia information.

After receiving the multimedia information, the playing terminal may play the received multimedia information. Exemplarily, the multimedia information played by the playing terminal at this moment is different from the multimedia information played by the playing terminal in Step 419.

In the aspect of the present disclosure, the user may acquire multiple pieces of multimedia information by using multiple acquisition devices, and the user may select multimedia information from the multiple pieces of multimedia information through the standardized server to enable the playing terminal to play the multimedia information selected by the user, so that a function of instructing broadcasting of the standardized server by the user is realized. During live broadcast of all users, the standardized server may be used for instructing broadcasting.

From the above, in the multimedia information playing method provided by the aspect of the present disclosure, the n acquisition devices may acquire the multimedia information of different viewing angles respectively, and the standardized server may select the initial multimedia information to be live broadcast by the host from the multimedia information of different viewing angles according to the selection instruction sent by the live broadcast terminal and send the initial multimedia information to the playing terminal to enable the playing terminal to play the multimedia information of different viewing angles, so that a multimedia information playing effect is improved.

It is important to note that a sequence of the steps of the multimedia information playing method provided by the aspect of the present disclosure may be properly regulated and the steps may also be added and reduced in response to the situation. Any method variations apparent to those skilled in the art within the technical scope disclosed by the present disclosure shall fall within the scope of protection of the present disclosure, and thus will not be elaborated.

Figure 6A:
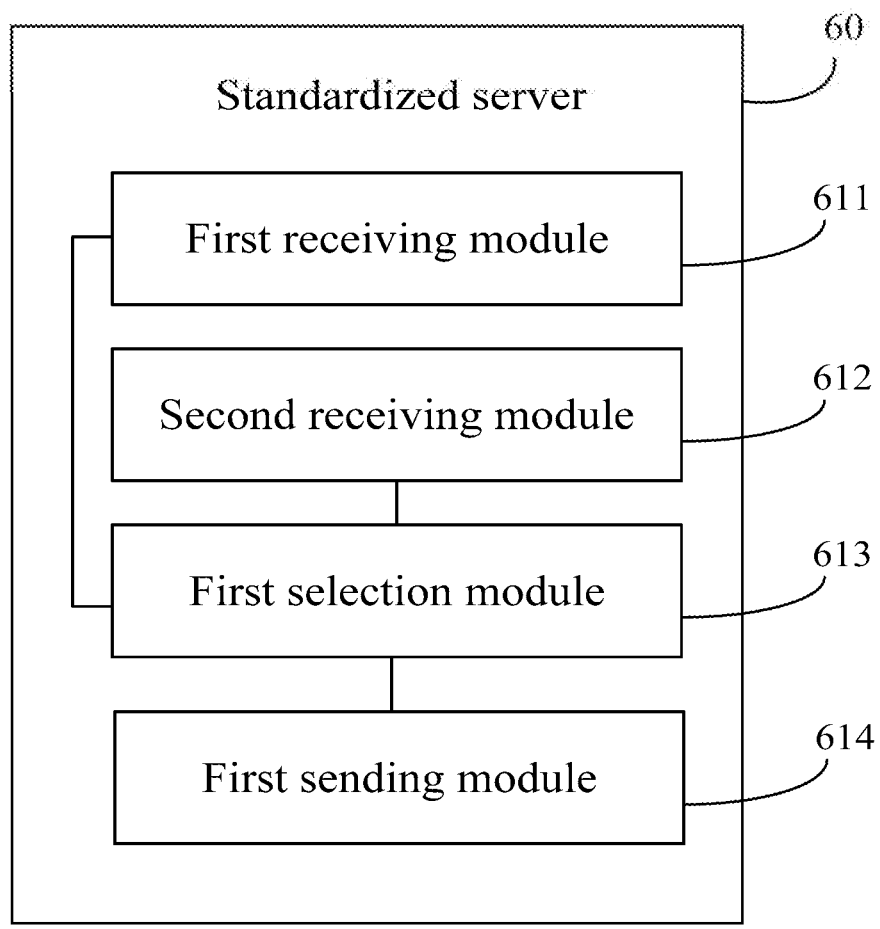
FIG. 6A is a structure diagram of a standardized server according to an exemplary aspect of the present disclosure.

FIG. 6A is a structure diagram of a standardized server 60 according to an exemplary aspect. The standardized server 60 may be the same as a standardized server 11 in a multimedia information playing system 1 shown in FIG. 1. The standardized server 60 may include:

a first receiving module 611, configured to receive n pieces of multimedia information sent by n acquisition devices respectively, each piece of multimedia information being obtained by acquiring ambient environmental information by a corresponding acquisition device;

a second receiving module 612, configured to receive a selection instruction sent by a live broadcast terminal;

a first selection module 613, configured to select initial multimedia information from the n pieces of multimedia information according to the selection instruction; and a first sending module 614, configured to send the initial multimedia information to a playing terminal to enable the playing terminal to play the initial multimedia information.

From the above, in the standardized server provided by the aspect of the present disclosure, the first selection module may select the initial multimedia information to be live broadcast by a host from the multimedia information, acquired by the n acquisition devices respectively, of different viewing angles according to the selection instruction sent by the live broadcast terminal, and the first sending module sends the initial multimedia information to the playing terminal to enable the playing terminal to play the multimedia information of different viewing angles, so that a multimedia information playing effect is improved.

Figure 6B:
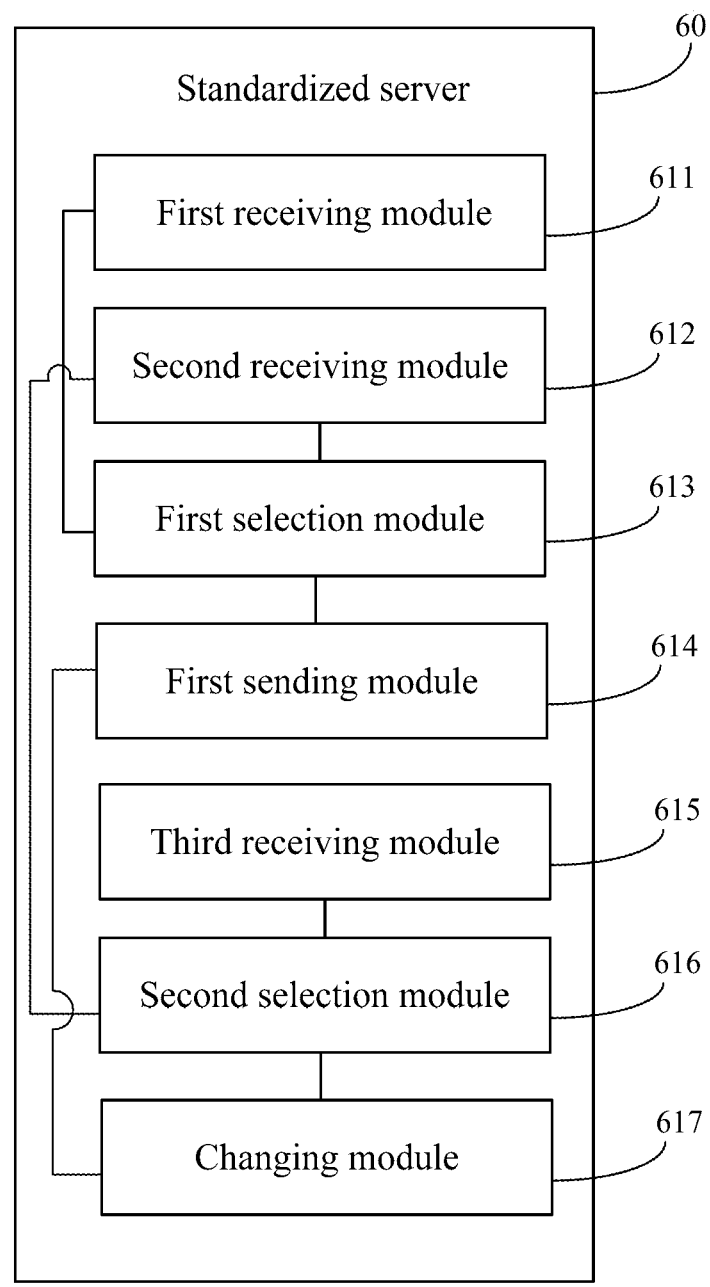
FIG. 6B is a structure diagram of another standardized server according to an exemplary aspect of the present disclosure.

Optionally, FIG. 6B is a structure diagram of another standardized server 60 according to an exemplary aspect. On the basis of FIG. 6A, the standardized server 60 may further include:

a third receiving module 615, configured to receive a changing instruction sent by the live broadcast terminal;

a second selection module 616, configured to select target multimedia information from the n pieces of multimedia information according to the changing instruction; and a changing module 617, configured to change multimedia information sent to the playing terminal from the initial multimedia information to the target multimedia information, and send the target multimedia information to the playing terminal to enable the playing terminal to play the target multimedia information.

Figure 6C:
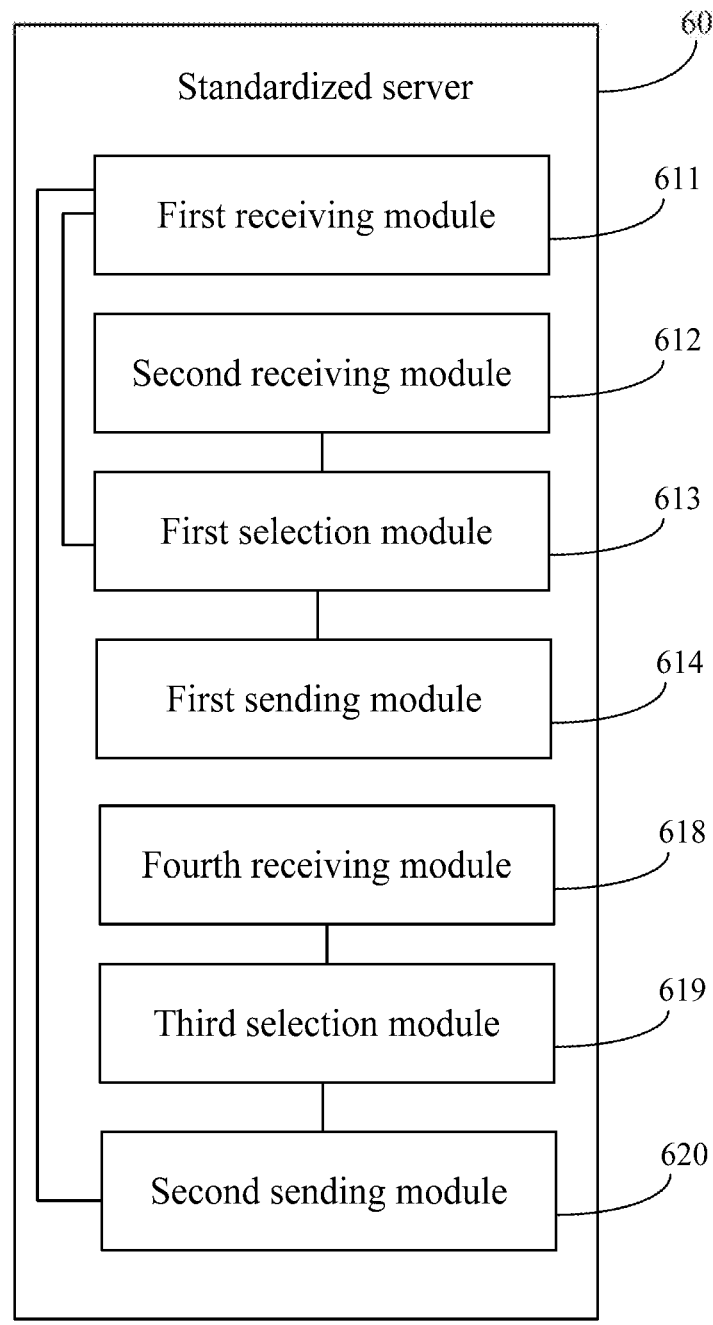
FIG. 6C is a structure diagram of another standardized server, according to an exemplary aspect of the present disclosure.

Optionally, FIG. 6C is a structure diagram of another standardized server 60 according to an exemplary aspect. The standardized server 60 may have at least three network addresses, and on the basis of FIG. 6A, the standardized server 60 may further include:

a fourth receiving module 618, configured to receive a live broadcast request of the live broadcast terminal, the live broadcast request containing the number n of the acquisition devices;

a third selection module 619, configured to select n first network addresses and a second network address from the at least three network addresses of the standardized server respectively, the n first network addresses and the second network address indicating different storage modules in the standardized server respectively; and a second sending module 620, configured to send the n first network addresses to the live broadcast terminal to enable the live broadcast terminal to send the n first network addresses to the n acquisition devices respectively.

The first receiving module 611 is further configured to: receive multimedia information sent by the n acquisition devices according to the n first network addresses respectively.

Figure 6D:
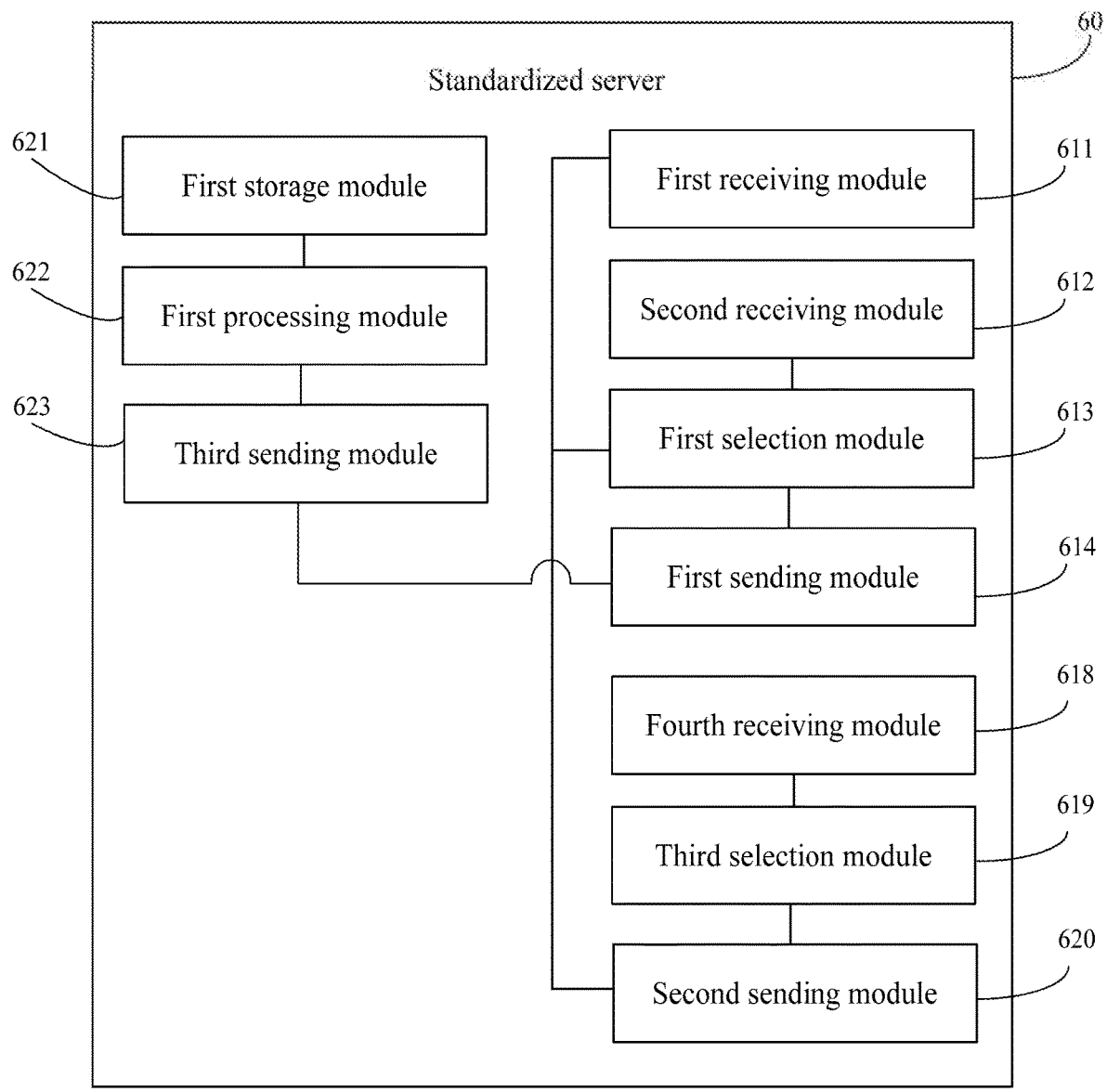
FIG. 6D is a structure diagram of another standardized server according to an exemplary aspect of the present disclosure.

Optionally, FIG. 6D is a structure diagram of another standardized server 60 according to an exemplary aspect. On the basis of FIG. 6C, the standardized server 60 may further include:

a first storage module 621, configured to store the n pieces of multimedia information in the storage modules indicated by the n first network addresses respectively;

a first processing module 622, configured to perform first standardized processing on the n pieces of multimedia information, parameters of the n pieces of multimedia information subjected to the first standardized processing being consistent with a playing parameter of the live broadcast terminal; and a third sending module 623, configured to send the n pieces of multimedia information subjected to the first standardized processing to the live broadcast terminal to enable the live broadcast terminal to simultaneously play the n pieces of multimedia information subjected to the first standardized processing and generate the selection instruction according to an operation of a user.

Figure 6E:
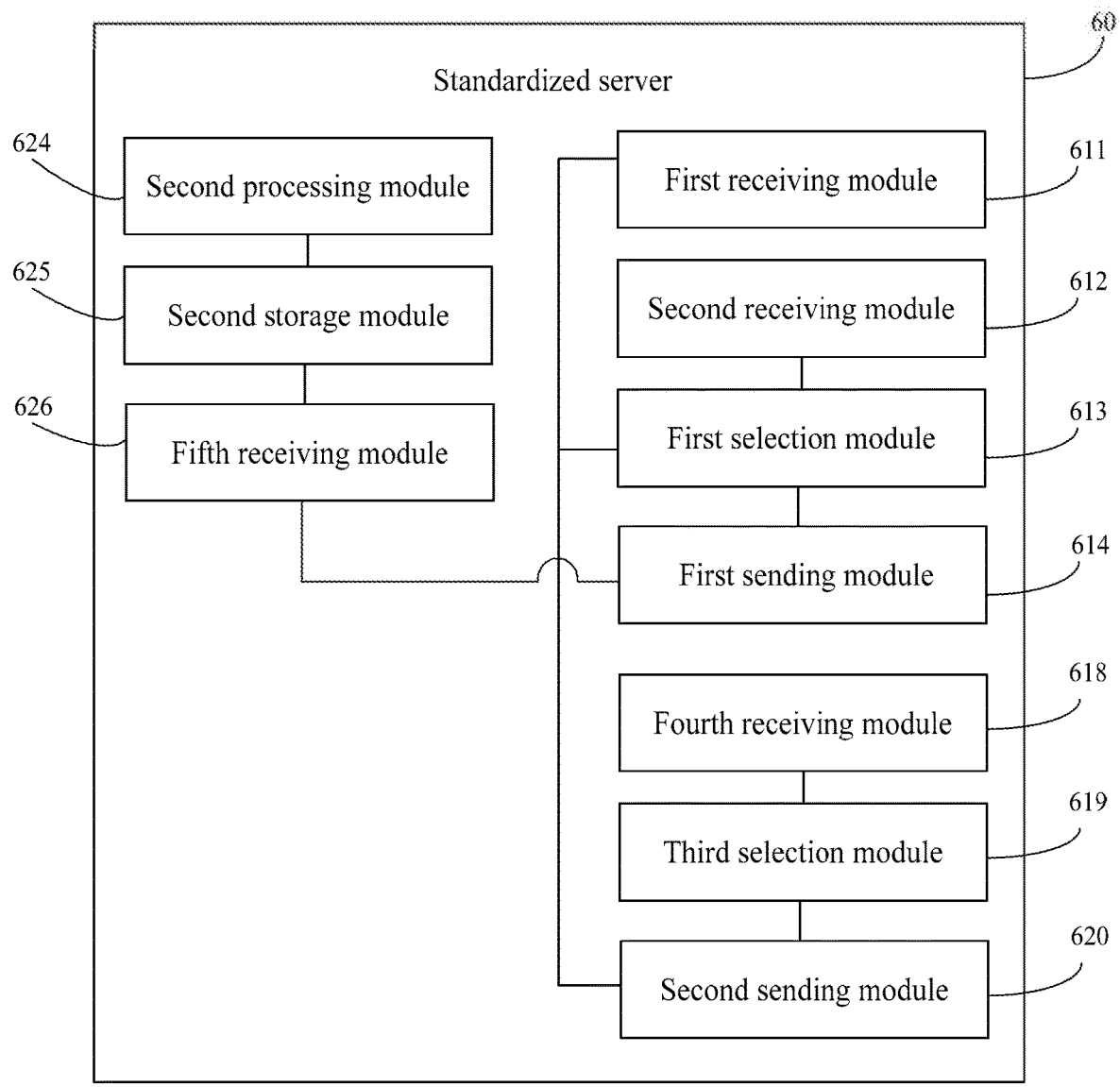
FIG. 6E is a structure diagram of a standardized server according to another exemplary aspect of the present disclosure.

Optionally, FIG. 6E is a structure diagram of a standardized server 60 according to another exemplary aspect. On the basis of FIG. 6C, the standardized server 60 may further include:

a second processing module 624, configured to perform second standardized processing on the initial multimedia information, the parameter of the initial multimedia information subjected to the second standardized processing being consistent with a playing parameter of the playing terminal;

a second storage module 625, configured to store the initial multimedia information subjected to the second standardized processing into the storage module indicated by the second network address; and a fifth receiving module 626, configured to receive a playing request of the playing terminal, the playing request containing the second network address.

The first sending module 614 is further configured to: acquire the initial multimedia information subjected to the second standardized processing from the storage module indicated by the second network address, and send the initial multimedia information subjected to the second standardized processing to the playing terminal by using a live broadcast delivery mechanism and a CDN mechanism.

Optionally, a format of the multimedia information acquired by each acquisition device is: an HDMI format or an SDI format.

Optionally, the first receiving module 611 may further be configured to: receive the n pieces of multimedia information sent by the n acquisition devices respectively on the basis of an RTMP.

From the above, in the standardized server provided by the aspect of the present disclosure, the first selection module may select the initial multimedia information to be live broadcast by the host from the multimedia information, acquired by the n acquisition devices respectively, of different viewing angles according to the selection instruction sent by the live broadcast terminal, and the first sending module sends the initial multimedia information to the playing terminal to enable the playing terminal to play the multimedia information of different viewing angles, so that the multimedia information playing effect is improved.

Figure 7A:
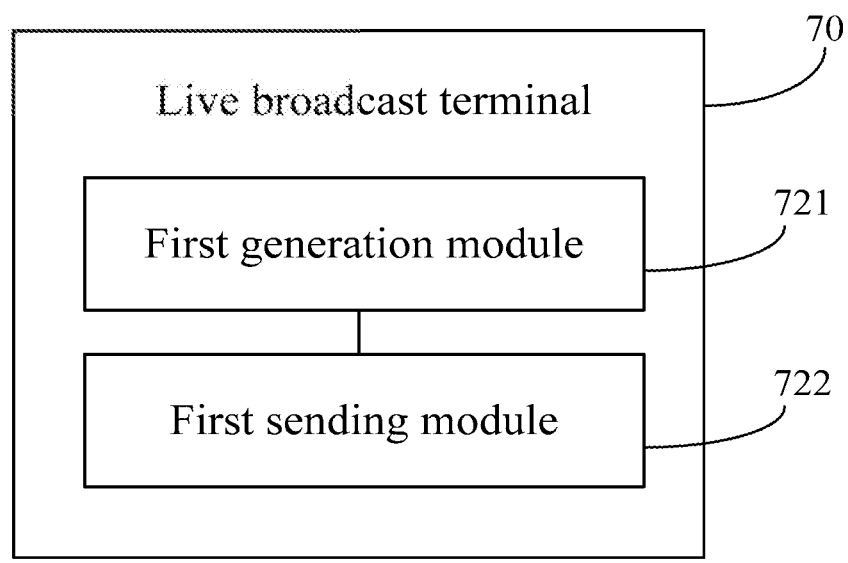
FIG. 7A is a structure diagram of a live broadcast terminal according to an exemplary aspect of the present disclosure.

FIG. 7A is a structure diagram of a live broadcast terminal 70 according to an exemplary aspect. The live broadcast terminal 70 is the same as a live broadcast terminal 12 in a multimedia information playing system 1 shown in FIG. 1. The live broadcast terminal 70 may include:

a first generation module 721, configured to generate a selection instruction according to a first operation of a user; and a first sending module 722, configured to send the selection instruction to a standardized server to enable the standardized server to select initial multimedia information from n pieces of multimedia information acquired by n acquisition devices according to the selection instruction and send the initial multimedia information to a playing terminal.

From the above, in the live broadcast terminal provided by the aspect of the present disclosure, when the first generation module generates the selection instruction according to the first operation of the user, the first sending module may send the selection instruction to the standardized server to enable the standardized server to select the initial multimedia information to be live broadcast by a host from the multimedia information, acquired by the n acquisition devices, of different viewing angles according to the selection instruction sent by the live broadcast terminal and send the initial multimedia information to the playing terminal to enable the playing terminal to play the multimedia information of different viewing angles, so that a multimedia information playing effect is improved.

Figure 7B:
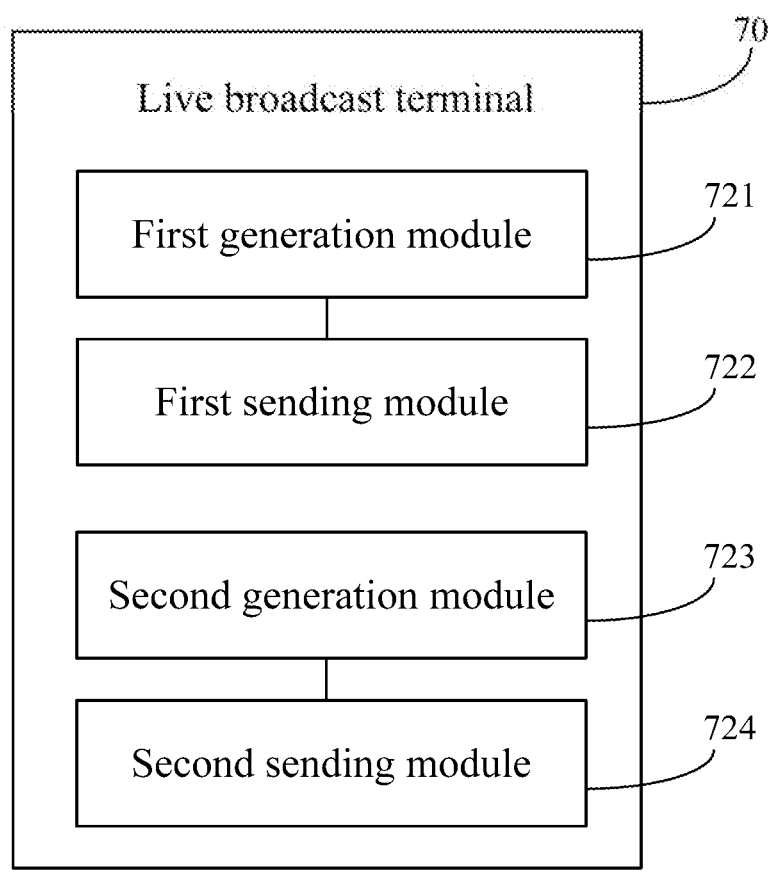
FIG. 7B is a structure diagram of another live broadcast terminal according to an exemplary aspect of the present disclosure.

Optionally, FIG. 7B is a structure diagram of another live broadcast terminal 70 according to an exemplary aspect. On the basis of FIG. 7A, the live broadcast terminal 70 may further include:

a second generation module 723, configured to generate a changing instruction according to a second operation of the user; and a second sending module 724, configured to send the changing instruction to the standardized server to enable the standardized server to change multimedia information sent to the playing terminal from the initial multimedia information to target multimedia information according to the changing instruction.

Figure 7C:
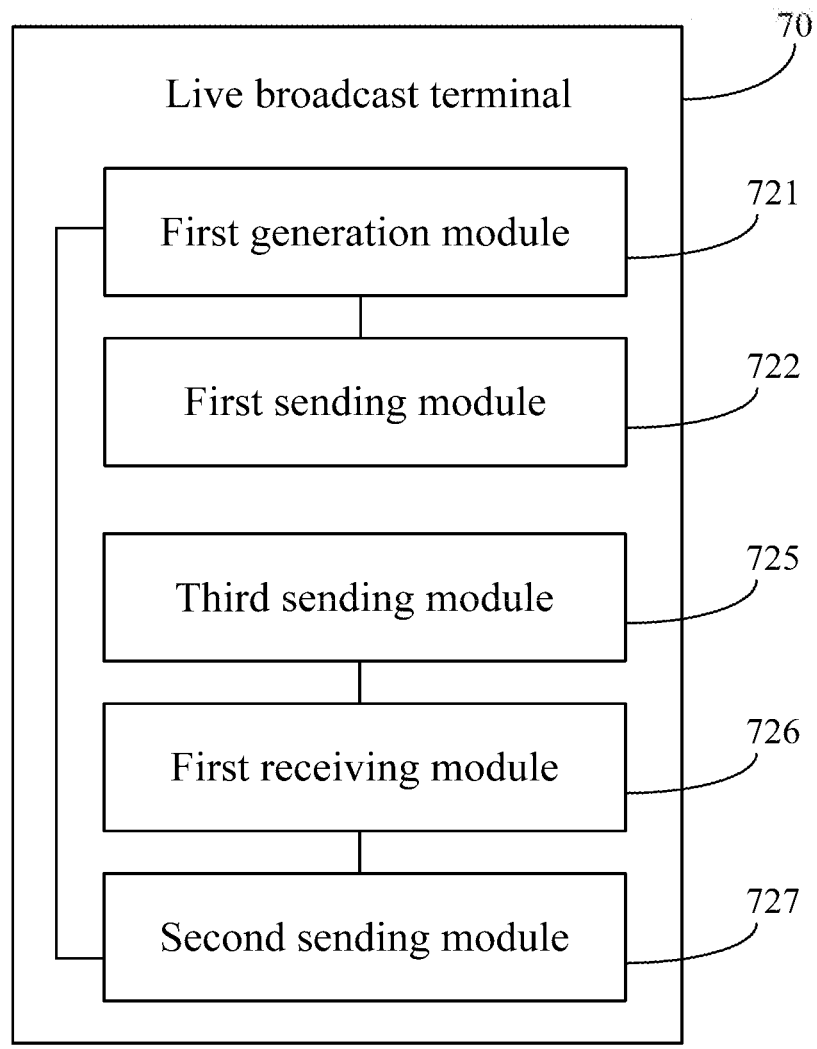
FIG. 7C is a structure diagram of another live broadcast terminal according to an exemplary aspect of the present disclosure.

Optionally, FIG. 7C is a structure diagram of another live broadcast terminal 70, according to an exemplary aspect. On the basis of FIG. 7A, the live broadcast terminal 70 may further include:

a third sending module 725, configured to, before the selection instruction is sent to the standardized server, send a live broadcast request to the standardized server, the live broadcast request containing the number n of the acquisition devices, to enable the standardized server to select n first network addresses and a second network address from at least three network addresses of the standardized server respectively;

a first receiving module 726, configured to receive the n first network addresses sent by the standardized server; and a second sending module 727, configured to send the n first network addresses to the n acquisition devices respectively to enable each of the n acquisition devices to send the multimedia information to the standardized server according to the received first network addresses after acquiring the multimedia information.

Figure 7D:
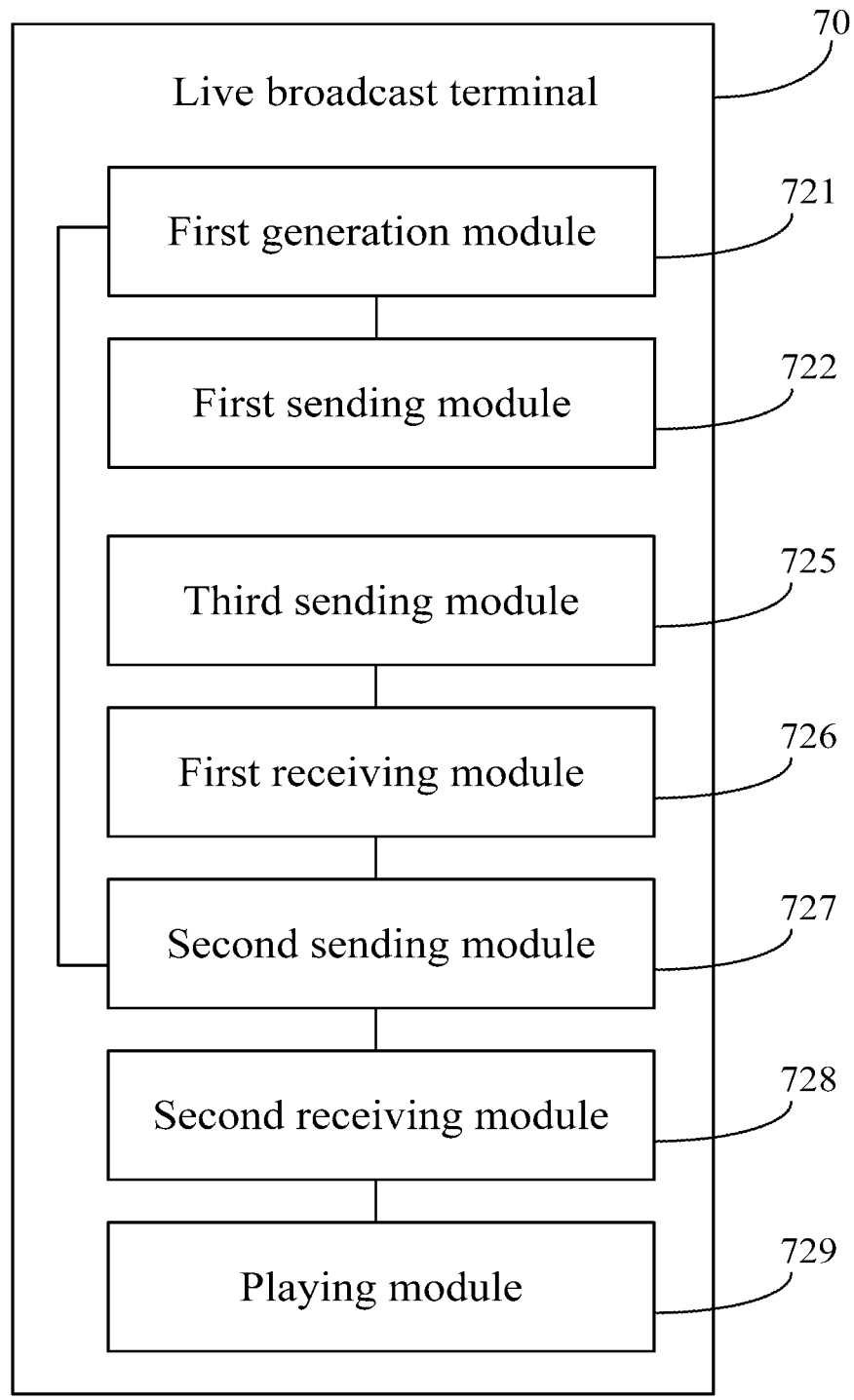
FIG. 7D is a structure diagram of another live broadcast terminal according to an exemplary aspect of the present disclosure.

Optionally, FIG. 7D is a structure diagram of another live broadcast terminal 70 according to an exemplary aspect. On the basis of FIG. 7C, the live broadcast terminal 70 may further include:

a second receiving module 728, configured to receive n pieces of multimedia information subjected to first standardized processing from the standardized server, the n pieces of multimedia information being stored in n storage modules indicated by the n first network addresses respectively; and a playing module 729, configured to synchronously play the n pieces of multimedia information subjected to the first standardized processing on a user interface.

Optionally, a format of the multimedia information acquired by each of the n acquisition devices is: an HDMI format or an SDI format.

From the above, in the live broadcast terminal provided by the aspect of the present disclosure, when the first generation module generates the selection instruction according to the first operation of the user, the first sending module may send the selection instruction to the standardized server to enable the standardized server to select the initial multimedia information to be live broadcast by the host from the multimedia information, acquired by the n acquisition devices, of different viewing angles according to the selection instruction sent by the live broadcast terminal and send the initial multimedia information to the playing terminal to enable the playing terminal to play the multimedia information of different viewing angles, so that the multimedia information playing effect is improved.

Figure 8:
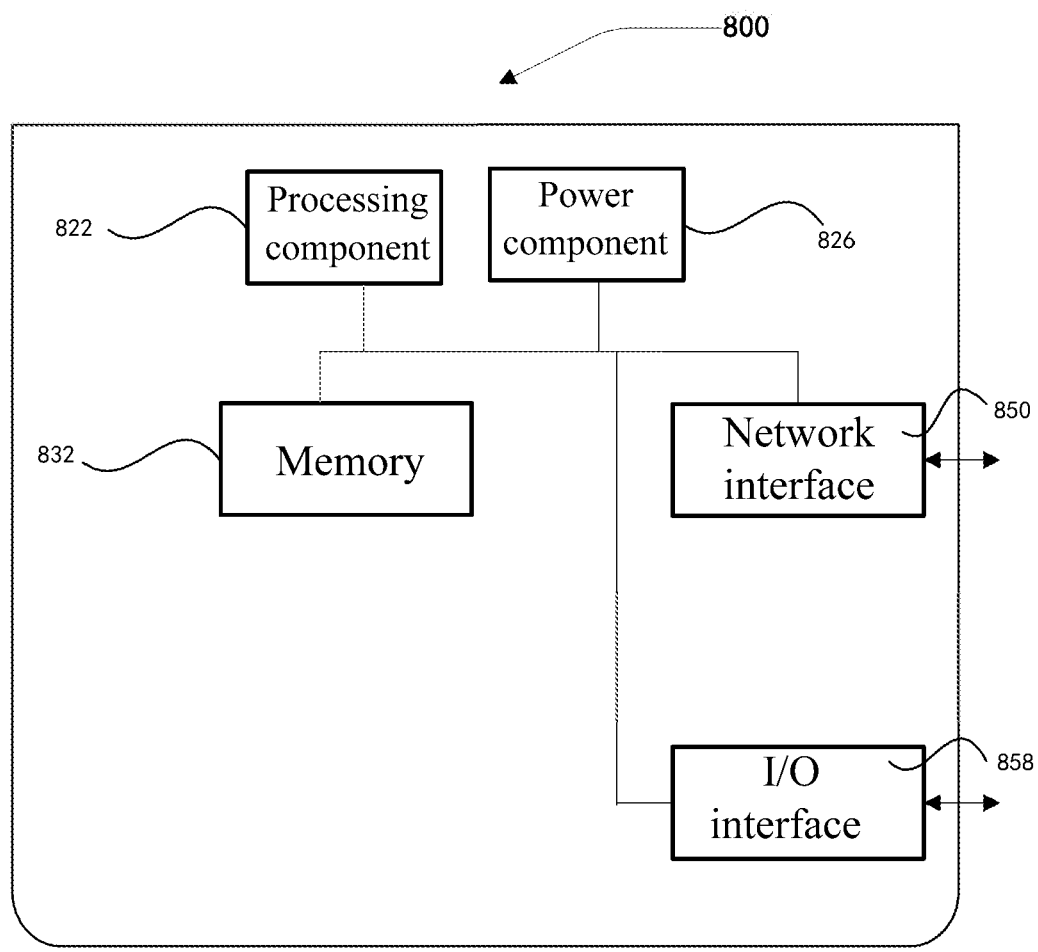
FIG. 8 is a structure diagram of another standardized server according to another exemplary aspect of the present disclosure.

FIG. 8 is a structure diagram of another standardized server 800 according to another exemplary aspect. The standardized server 800 may be a standardized server 11 in a multimedia information playing system 1 shown in FIG. 1. Referring to FIG. 8, the standardized server 800 includes a processing component 822, further including one or more processors, and a memory resource represented by a memory 832, configured to store instructions executable by the processing component 822, such as application programs. The application programs stored in the memory 832 may include one or more than one module of which each corresponds to a set of instructions. In addition, the processing component 822 is configured to execute the instructions, so as to execute the multimedia information playing method shown in FIG. 2.

The standardized server 800 may further include a power component 826 configured to execute power management of the standardized server 800, a wired or wireless network interface 850 configured to connect the standardized server 800 to a network, and an Input Output (I/O) interface 858. The standardized server 800 may be operated on the basis of an operating system stored in the memory 832, such as Windows Server™, Mac OS X™, Unix™, Linux™ or FreeBSD™.

From the above, in the standardized server provided by the aspect of the present disclosure, the standardized server may select initial multimedia information to be live broadcast by a host from multimedia information, acquired by n acquisition devices, of different viewing angles according to a selection instruction sent by a live broadcast terminal and send the initial multimedia information to a playing terminal to enable the playing terminal to play the multimedia information of different viewing angles, so that a multimedia information playing effect is improved.

Figure 9:
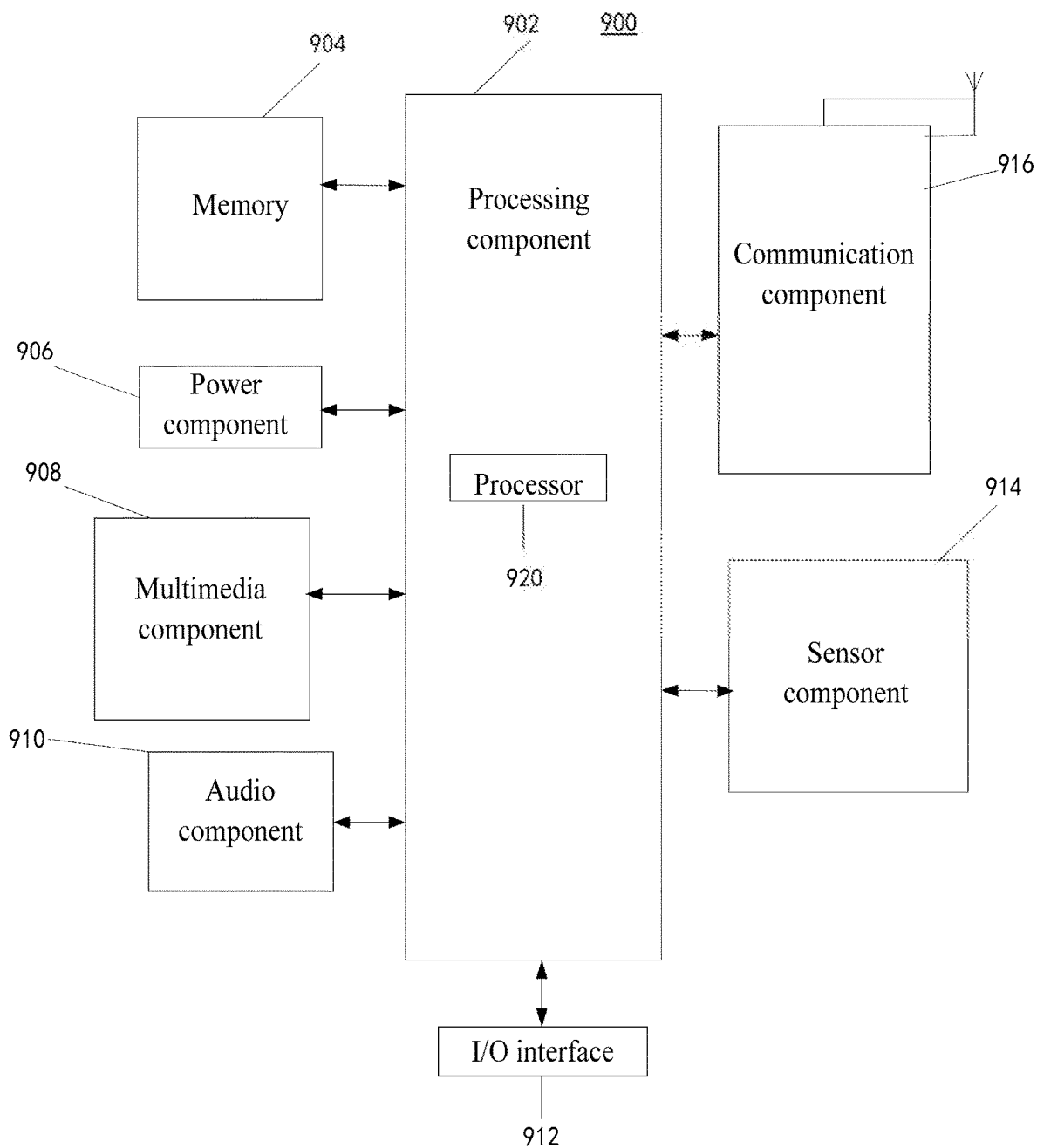
FIG. 9 is a structure diagram of a live broadcast terminal according to another exemplary aspect of the present disclosure.

FIG. 9 is a structure diagram of a live broadcast terminal 900 according to another exemplary aspect. The live broadcast terminal 900 may be a live broadcast terminal 12 in a multimedia information playing system 1 shown in FIG. 1. For example, the live broadcast terminal 900 may be a mobile phone, a computer, a digital broadcast terminal, a messaging device, a gaming console, a tablet, a medical device, exercise equipment, a personal digital assistant and the like.

Referring to FIG. 9, the live broadcast terminal 900 may include one or more of the following components: a processing component 902, a memory 904, a power component 906, a multimedia component 908, an audio component 910, an I/O interface 912, a sensor component 914, and a communication component 916.

The processing component 902 typically controls overall operations of the live broadcast terminal 900, such as the operations associated with display, telephone calls, data communications, camera operations, and recording operations. The processing component 902 may include one or more processors 920 to execute instructions to perform all or part of the steps in the above-mentioned method. Moreover, the processing component 902 may include one or more modules which facilitate interaction between the processing component 902 and the other components. For instance, the processing component 902 may include a multimedia module to facilitate interaction between the multimedia component 908 and the processing component 902.

The memory 904 is configured to store various types of data to support the operation of the live broadcast terminal 900. Examples of such data include instructions for any application programs or methods operated on the live broadcast terminal 900, contact data, phonebook data, messages, pictures, video, etc. The memory 904 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 906 provides power for various components of the live broadcast terminal 900. The power component 906 may include a power management system, one or more power supplies, and other components associated with the generation, management and distribution of power for the live broadcast terminal 900.

The multimedia component 908 includes a screen providing an output interface between the live broadcast terminal 900 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some aspects, the multimedia component 908 includes a front camera and/or a rear camera. The front camera and/or the rear camera may receive external multimedia data when the live broadcast terminal 900 is in an operation mode, such as a photographing mode or a video mode. Each of the front camera and the rear camera may be a fixed optical lens system or have focusing and optical zooming capabilities.

The audio component 910 is configured to output and/or input an audio signal. For example, the audio component 910 includes a Microphone (MIC), and the MIC is configured to receive an external audio signal when the live broadcast terminal 900 is in the operation mode, such as a call mode, a recording mode and a voice recognition mode. The received audio signal may be further stored in the memory 904 or sent through the communication component 916. In some aspects, the audio component 910 further includes a speaker configured to output the audio signal.

The I/O interface 912 provides an interface between the processing component 902 and a peripheral interface module, and the peripheral interface module may be a keyboard, a click wheel, a button and the like. The button may include, but not limited to: a home button, a volume button, a starling button and a locking button.

The sensor component 914 includes one or more sensors configured to provide status assessment in various aspects for the live broadcast terminal 900. For instance, the sensor component 914 may detect an on/off status of the live broadcast terminal 900 and relative positioning of components, such as a display and small keyboard of the live broadcast terminal 900, and the sensor component 914 may further detect a change in a position of the live broadcast terminal 900 or a component of the live broadcast terminal 900, presence or absence of contact between the user and the live broadcast terminal 900, orientation or acceleration/deceleration of the live broadcast terminal 900 and a change in temperature of the live broadcast terminal 900. The sensor component 914 may include a proximity sensor configured to detect presence of an object nearby without any physical contact. The sensor component 914 may also include a light sensor, such as a Complementary Metal Oxide Semiconductor (CMOS) or Charge Coupled Device (CCD) image sensor, configured for use in an imaging application. In some aspects, the sensor component 914 may also include an acceleration sensor, a gyroscope sensor, a magnetic sensor, a pressure sensor or a temperature sensor.

The communication component 916 is configured to facilitate wired or wireless communication between the live broadcast terminal 900 and another device. The live broadcast terminal 900 may access a communication-standard-based wireless network, such as a WiFi network, a 2nd-Generation (2G) or 3rd-Generation (3G) network or a combination thereof. In an exemplary aspect, the communication component 916 receives a broadcast signal or broadcast associated information from an external broadcast management system through a broadcast channel. In an exemplary aspect, the communication component 916 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BT technology and another technology.

In an exemplary aspect, the live broadcast terminal 900 may be implemented by one or more Application Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, micro-controllers, microprocessors or other electronic components, and is configured to execute the abovementioned method.

In an exemplary aspect, there is also provided a non-transitory computer-readable storage medium including instructions, such as the memory 904 including instructions, and the instructions may be executed by the processor 920 of the live broadcast terminal 900 to implement the above-mentioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, the instructions in the storage medium is executed by the processor of the live broadcast terminal 900 to enable the live broadcast terminal 900 to execute a multimedia information playing method, the method including that:

n pieces of multimedia information sent by n acquisition devices respectively are received, each piece of multimedia information being obtained by acquiring ambient environmental information by a corresponding acquisition device;

a selection instruction sent by the live broadcast terminal is received;

initial multimedia information is selected from the n pieces of multimedia information according to the selection instruction; and the initial multimedia information is sent to a playing terminal to enable the playing terminal to play the initial multimedia information.

Optionally, the method may further include that:
a changing instruction sent by the live broadcast terminal is received;
target multimedia information is selected from the n pieces of multimedia information according to the changing instruction; and
multimedia information sent to the playing terminal is changed from the initial multimedia information to the target multimedia information, and the target multimedia information is sent to the playing terminal to enable the playing terminal to play the target multimedia information.

Optionally, the standardized server has al least three network addresses, and the method may further include that:
a live broadcast request of the live broadcast terminal is received, the live broadcast request containing the number n of the acquisition devices;
n first network addresses and a second network address are selected from the at least three network addresses of the standardized server respectively, the n first network addresses and the second network address indicating different storage modules in the standardized server respectively;
the n first network addresses are sent to the live broadcast terminal to enable the live broadcast terminal to send the n first network addresses to the n acquisition devices respectively; and
the step that the n pieces or multimedia information sent by the n acquisition devices respectively are received includes that:
multimedia information sent by the n acquisition devices according to the n first network addresses respectively is received.

Optionally, the method may further include that:
the n pieces of multimedia information are stored in the storage modules indicated by the n first network addresses respectively;
first standardized processing is performed on the n pieces of multimedia information, parameters of the n pieces of multimedia information subjected to the first standardized processing being consistent with a playing parameter of the live broadcast terminal; and
the n pieces of multimedia information subjected to the first standardized processing are sent to the live broadcast terminal to enable the live broadcast terminal to simultaneously play the n pieces of multimedia information subjected to the first standardized processing and generate the selection instruction according to an operation of a user.

Optionally, the method may further include that:
second standardized processing is performed on the initial multimedia information, the parameter of the initial multimedia information subjected to the second standardized processing being consistent with a playing parameter of the playing terminal;
the initial multimedia information subjected to the second standardized processing is stored into the storage module indicated by the second network address;
a playing request of the playing terminal is received, the playing request containing the second network address;
the step that the initial multimedia information is sent to the playing terminal includes that:
the initial multimedia information subjected to the second standardized processing is acquired from the storage module indicated by the second network address; and
the initial multimedia information subjected to the second standardized processing is sent to the playing terminal by using a live broadcast delivery mechanism and a CDN mechanism.

Optionally, the method may further include that:
a format of the multimedia information acquired by each acquisition device is: an HDMI format or an SDI format.

Optionally, the method may further include that:
the step that the n pieces of multimedia information sent by the n acquisition devices respectively are received includes that:
the n pieces of multimedia information sent by the n acquisition devices respectively are received on the basis of an RTMP.

From the above, in the multimedia information playing method provided by the aspect of the present disclosure, the standardized server may select the initial multimedia information to be live broadcast by a host from the multimedia information, acquired by the n acquisition devices, of different viewing angles according to the selection instruction sent by the live broadcast terminal and send the initial multimedia information to the playing terminal to enable the playing terminal to play the multimedia information of different viewing angles, so that a multimedia information playing effect is improved.

Those skilled in the art may clearly understand that all of the abovementioned multimedia information playing method aspect, standardized server aspect and live broadcast terminal aspect may refer to each other for convenient and concise description, which will not be elaborated herein.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A multimedia information playing method, applied to a standardized server in a multimedia information playing system, the multimedia information playing system including n acquisition devices, the standardized server, a live broadcast terminal and a playing terminal, n being an integer more than or equal to 2, the method comprising:
receiving n pieces of multimedia information from the n acquisition devices, respectively, each of the n pieces of multimedia information being obtained by acquiring ambient environmental information by a corresponding acquisition device;
receiving a selection instruction from the live broadcast terminal;
selecting initial multimedia information from the n pieces of multimedia information based on the selection instruction; and
sending the initial multimedia information to the playing terminal that is configured to play the initial multimedia information,
wherein the standardized server has at least three network addresses, and the method further comprises:
receiving a live broadcast request of the live broadcast terminal, the live broadcast request including the number n of the acquisition devices;
selecting n first network addresses and a second network address from the at least three network addresses of the standardized server respectively, the n first network addresses and the second network address indicating different storage modules in the standardized server, respectively; and
sending the n first network addresses to the live broadcast terminal to enable the live broadcast terminal to send the n first network addresses to the n acquisition devices respectively,
wherein receiving the n pieces of multimedia information sent by the n acquisition devices, respectively, comprises receiving multimedia information sent by the n acquisition devices based on the n first network addresses, respectively.

2. The method of claim 1, further comprising:
receiving a changing instruction from the live broadcast terminal;
selecting target multimedia information from the n pieces of multimedia information based on the changing instruction;
changing multimedia information to be sent to the playing terminal from the initial multimedia information to the target multimedia information; and
sending the target multimedia information to the playing terminal that is configured to play the target multimedia information.

3. The method of claim 1, further comprising:
storing the n pieces of multimedia information in the storage modules indicated by the n first network addresses, respectively;
performing first standardized processing on the n pieces of multimedia information, parameters of the n pieces of multimedia information subjected to the first standardized processing being consistent with a playing parameter of the live broadcast terminal; and
sending the n pieces of multimedia information subjected to the first standardized processing to the live broadcast terminal that is configured to simultaneously play the n pieces of multimedia information subjected to the first standardized processing and generate the selection instruction based on an operation of a user.

4. The method of claim 1, further comprising:
performing second standardized processing on the initial multimedia information, a parameter of the initial multimedia information subjected to the second standardized processing being consistent with a playing parameter of the playing terminal;
storing the initial multimedia information subjected to the second standardized processing into the storage module indicated by the second network address; and
receiving a playing request of the playing terminal, the playing request including the second network address,
wherein sending the initial multimedia information to the playing terminal comprises:
acquiring the initial multimedia information subjected to the second standardized processing from the storage module indicated by the second network address; and
sending the initial multimedia information subjected to the second standardized processing to the playing terminal by using a live broadcast delivery mechanism and a Content Delivery Network (CDN) mechanism.

5. The method of claim 1, wherein a format of the multimedia information acquired by each acquisition device is: a High Definition Multimedia Interface (HDMI) format or a Serial Digital Interface (SDI) format.

6. The method of claim 1, wherein receiving the n pieces of multimedia information from the n acquisition devices, respectively, comprises receiving the n pieces of multimedia information sent by the n acquisition devices respectively on the basis of a Real Time Messaging Protocol (RTMP).

7. A multimedia information playing method, applied to a live broadcast terminal in a multimedia information playing system, the multimedia information playing system including n acquisition devices, a standardized server, the live broadcast terminal and a playing terminal, n being an integer more than or equal to 2, the method comprising:
generating a selection instruction based on a first operation of a user, and
sending the selection instruction to the standardized server that is configured to select initial multimedia information from n pieces of multimedia information acquired by the n acquisition devices based on the selection instruction, and send the initial multimedia information to the playing terminal,
wherein the standardized server has at least three network addresses, and the method further comprises:
before the selection instruction is sent to the standardized server, sending a live broadcast request to the standardized server, the live broadcast request including the number n of the acquisition devices, to enable the standardized server to select n first network addresses and a second network address from the at least three network addresses of the standardized server, respectively:
receiving the n first network addresses sent by the standardized server; and
sending the n first network addresses to the n acquisition devices respectively to enable each of the n acquisition devices to send the multimedia information to the standardized server based on the received first network addresses after acquiring the multimedia information.

8. The method of claim 7, further comprising:
generating a changing instruction based on a second operation of the user; and
sending the changing instruction to the standardized server that is configured to change multimedia information to be sent to the playing terminal from the initial multimedia information to target multimedia information based on the changing instruction.

9. The method of claim 7, further comprising:
receiving n pieces of multimedia information subjected to first standardized processing from the standardized server, the n pieces of multimedia information being stored in n storage modules indicated by the n first network addresses respectively; and
synchronously playing the n pieces of multimedia information subjected to the first standardized processing on a user interface.

10. The method of claim 7, wherein a format of the multimedia information acquired by each of the n acquisition devices is: a High-Definition Multimedia Interface (HDMI) format or a Serial Digital Interface (SDI) format.

11. A standardized server, belonging to a multimedia information playing system, the multimedia information playing system including n acquisition devices, the standardized server, a live broadcast terminal and a playing terminal, n being an integer more than or equal to 2, the standardized server comprising:
a processor; and
a memory configured to store instructions executable by the processor,
wherein the processor is configured to:
receive n pieces of multimedia information from the n acquisition devices, respectively, each of the n pieces of multimedia information being obtained by acquiring ambient environmental information by a corresponding acquisition device;
receive a selection instruction from the live broadcast terminal;
select initial multimedia information from the n pieces of multimedia information based on the selection instruction; and
send the initial multimedia information to the playing terminal that is configured to play the initial multimedia information,
wherein the standardized server has at least three network addresses, and wherein the processor is further configured to:
receive a live broadcast request of the live broadcast terminal, the live broadcast request including the number n of the acquisition devices;
select n first network addresses and a second network address from the at least three network addresses of the standardized server respectively, the n first network addresses and the second network address indicating different storage modules in the standardized server, respectively;
send the n first network addresses to the live broadcast terminal to enable the live broadcast terminal to send the n first network addresses to the n acquisition devices, respectively; and
receive multimedia information sent by the n acquisition devices based on the n first network addresses, respectively.

12. The standardized server of claim 11, wherein the processor is further configured to:
receive a changing instruction from the live broadcast terminal;
select target multimedia information from the n pieces of multimedia information based on the changing instruction;
change multimedia information to be sent to the playing terminal from the initial multimedia information to the target multimedia information; and
send the target multimedia information to the playing terminal that is configured to play the target multimedia information.

13. The standardized server of claim 11, wherein the processor is further configured to:
store the n pieces of multimedia information in the storage modules indicated by the n first network addresses respectively;
perform first standardized processing on the n pieces of multimedia information, parameters of the n pieces of multimedia information subjected to the first standardized processing being consistent with a playing parameter of the live broadcast terminal; and send the n pieces of multimedia information subjected to the first standardized processing to the live broadcast terminal that is configured to simultaneously play the n pieces of multimedia information subjected to the first standardized processing and generate the selection instruction based on an operation of a user.

14. The standardized server of claim 11, wherein the processor is further configured to:
perform second standardized processing on the initial multimedia information, a parameter of the initial multimedia information subjected to the second standardized processing being consistent with a playing parameter of the playing terminal;
store the initial multimedia information subjected to the second standardized processing into the storage module indicated by the second network address;
receive a playing request of the playing terminal, the playing request including the second network address;
acquire the initial multimedia information subjected to the second standardized processing from the storage module indicated by the second network address; and
send the initial multimedia information subjected to the second standardized processing to the playing terminal by using a live broadcast delivery mechanism and a Content Delivery Network (CDN) mechanism.

15. The standardized server of claim 11, wherein a format of the multimedia information acquired by each acquisition device is: a High-Definition Multimedia Interface (HDMI) format or a Serial Digital Interface (SDI) format.

16. The standardized server of claim 11, wherein the processor is further configured to receive the n pieces of multimedia information sent by the n acquisition devices respectively on the basis of a Real Time Messaging Protocol (RTMP).

17. A live broadcast terminal, belonging to a multimedia information playing system, the multimedia information playing system including n acquisition devices, a standardized server and a playing terminal, n being an integer more than or equal to 2, the live broadcast terminal comprising:
a processor; and
a memory configured to store instructions executable by the processor,
wherein the processor is configured to:
generate a selection instruction based on a first operation of a user, and
send the selection instruction to the standardized server that is configured to select initial multimedia information from n pieces of multimedia information acquired by the n acquisition devices based on the selection instruction, and send the initial multimedia information to the playing terminal,
wherein the standardized server has at least three network addresses, and the processor is further configured to:
before the selection instruction is sent to the standardized server, send a live broadcast request to the standardized server, the live broadcast request including the number n of the acquisition devices, to enable the standardized server to select n first network addresses and a second network address from the at least three network addresses of the standardized server respectively;
receive the n first network addresses sent by the standardized server; and
send the n first network addresses to the n acquisition devices respectively to enable each of the n acquisition devices to send the multimedia information to the standardized server based on the received first network addresses after acquiring the multimedia information.

18. The live broadcast terminal of claim 17, wherein the processor is further configured to:
generate a changing instruction based on a second operation of the user; and
send the changing instruction to the standardized server that is configured to change multimedia information to be sent to the playing terminal from the initial multimedia information to target multimedia information based on the changing instruction.

19. The live broadcast terminal of claim 17, wherein the processor is further configured to:
receive n pieces of multimedia information subjected to first standardized processing from the standardized server, the n pieces of multimedia information being stored in n storage modules indicated by the n first network addresses respectively; and
synchronously play the n pieces of multimedia information subjected to the first standardized processing on a user interface.

20. The live broadcast terminal of claim 17, wherein a format of the multimedia information acquired by each of the n acquisition devices is: a High-Definition Multimedia Interface (HDMI) format or a Serial Digital Interface (SDI) format.

* * * * *